(12) United States Patent
Zhu et al.

(10) Patent No.: US 10,919,920 B2
(45) Date of Patent: Feb. 16, 2021

(54) METHOD FOR THE MANUFACTURE OF ALKOXYSILYL-CONTAINING THIOCARBOXYLIC ACID ESTERS

(71) Applicant: Momentive Performance Materials Inc., Waterford, NY (US)

(72) Inventors: Yanjun Zhu, Rye Brook, NY (US); Linda Vecere, Fishkill, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 16/855,011

(22) Filed: Apr. 22, 2020

(65) Prior Publication Data

US 2020/0347084 A1    Nov. 5, 2020

Related U.S. Application Data

(60) Provisional application No. 62/840,752, filed on Apr. 30, 2019.

(51) Int. Cl.
  *C07F 7/18* (2006.01)

(52) U.S. Cl.
  CPC ................................. *C07F 7/1876* (2013.01)

(58) Field of Classification Search
  CPC ................................................... C07F 7/1876
  See application file for complete search history.

(56) References Cited

U.S. PATENT DOCUMENTS

| | | | |
|---|---|---|---|
| 3,829,505 A | 8/1974 | Johnston et al. | |
| 3,941,849 A | 3/1976 | Herold | |
| 3,992,427 A * | 11/1976 | Chandra | C07F 7/1876 556/453 |
| 4,242,490 A | 12/1980 | Duncan et al. | |
| 4,335,188 A | 6/1982 | Igi et al. | |
| 4,687,851 A | 8/1987 | Laughner | |
| 4,985,491 A | 1/1991 | Reisch | |
| 5,096,993 A | 3/1992 | Smith et al. | |
| 5,100,997 A | 3/1992 | Reisch et al. | |
| 5,106,874 A | 4/1992 | Porter et al. | |
| 5,116,931 A | 5/1992 | Reisch et al. | |
| 6,159,695 A * | 12/2000 | McGovern | B01J 20/3242 427/299 |
| 6,169,194 B1 * | 1/2001 | Thompson | B01J 20/3242 204/600 |
| 6,608,125 B2 | 8/2003 | Cruse et al. | |
| 6,777,569 B1 | 8/2004 | Westmeyer et al. | |
| 8,008,520 B2 | 8/2011 | Cruse et al. | |
| 9,346,920 B2 * | 5/2016 | Takada | C09D 183/08 |
| 2012/0225231 A1 | 9/2012 | York | |
| 2014/0107366 A1 * | 4/2014 | Lewis | C07F 7/1804 556/479 |
| 2019/0048032 A1 * | 2/2019 | Albert | C07F 7/1876 |
| 2020/0017533 A1 * | 1/2020 | Bertin | C07F 7/1804 |

FOREIGN PATENT DOCUMENTS

| | | | |
|---|---|---|---|
| CN | 103709188 A | * | 4/2014 |
| CN | 103709188 A | | 4/2014 |

OTHER PUBLICATIONS

Dang, English-Language Machine Translation of CN 103709188 (2014) (Year: 2014).*
Voronkov et al.; "Acyliodides in organic synthesis. Reaction of acetyl iodide with thiols; Russian Journal of Organic Chemistry"; 47(12): Dec. 2011; 1789-1791.
International Search Report and Written Opinion from PCT/US2020/029195 dated Jun. 30, 2020.

* cited by examiner

*Primary Examiner* — Alexander R Pagano
(74) *Attorney, Agent, or Firm* — James C. Abruzzo

(57) ABSTRACT

There is provided herein a method for the manufacture of alkoxysilyl-containing thiocarboxylic acid ester which comprises reacting a thioester with a mercapto-functional alkoxysilane and/or an alkali metal salt, an alkaline earth metal salt, a trisubstituted ammonium salt of an alkoxysilyl-functional thiolate which uses economical and readily available reagents, avoids the use of phosgene or thionyl chloride reagents and produces byproducts that may be recycled.

28 Claims, No Drawings

METHOD FOR THE MANUFACTURE OF ALKOXYSILYL-CONTAINING THIOCARBOXYLIC ACID ESTERS

CROSS-REFERENCE TO RELATED APPLICATIONS

This application claims priority to U.S. Application Ser. No. 62/840,752, filed Apr. 30, 2019, the entire contents of which are incorporated herein by reference.

FIELD OF THE INVENTION

The present invention provides for a method to make alkoxysilyl-containing thiocarboxylic acid esters which avoids the use of phosgene or thionyl chloride reagents and minimizes non-recyclable and environmentally harmful byproducts and alkoxysilyl-containing thiocarboxylic acid ester compositions comprising the alkoxysilyl-containing thiocarboxylic acid esters and thioesters.

BACKGROUND OF THE INVENTION

Alkoxysilyl-containing thiocarboxylic acid esters are derivatives of mercapto-functional alkoxysilanes in which the mercapto hydrogen atom is replaced by an acyl group, hereinafter referred to as a "blocking group". The alkoxysilyl-containing thiocarboxylic acid esters are often referred to as blocked mercaptosilanes. These alkoxysilyl-containing thiocarboxylic acid esters can be used as dispersing agents to improve the dispersion of inorganic fillers in polymers, especially rubbers, and as coupling agents between polymers and inorganic fillers after they are deblocked by the use of a deblocking agent during compounding to form a reactive mercapto-functional group. These silane-coupled mineral-filled polymers can be used in the manufacture of various products, especially tires when the polymers are rubber.

The alkoxysilyl-containing thiocarboxylic acid esters have been made by various conventional methods. However, these methods have generally relied on acyl chloride intermediates, also known as carboxylic acid halide intermediates, which require the use of toxic phosgene or thionyl chloride in their preparation from carboxylic acids, and generate chloride compounds, such as alkali metal chloride salts. These alkali metal salts are wastes contaminated with organic compounds that require proper disposal.

For example, alkoxysilyl-containing thiocarboxylic acid esters have been prepared by reacting carboxylic acid halide with aqueous alkali metal sulfides to generate an aqueous solution of an alkali metal salt of thiocarboxylic acid, which is subsequently reacted with a halo-functional alkoxysilane. The method generates two equivalents of alkali metal halide dissolved in water, which needs to be properly disposed of as waste, and a second non-aqueous phase containing the product. The non-aqueous phase containing the product needs to be separated from the aqueous phase containing the alkali metal salts, and may contain phase transfer catalysts to facilitate the two-phase reaction. Another method involves reacting a carboxylic acid halide with an alkali metal salt of the alkoxysilyl-functional mercaptide. The resulting byproduct, an alkali metal halide, precipitates from the reaction mixture. Separation of the alkali metal halide from the alkoxysilyl-containing thiocarboxylic acid ester product require filtration, centrifugation or decantation, leading to loss of product and the need to properly disposed of the alkali metal halide salt.

As a result of the problems associated with conventional processes for making alkoxysilyl-containing thiocarboxylic acid esters there is a need for a method which avoids the use of toxic phosgene or thionyl halides to generate acyl halide intermediates and which minimizes the formation of non-recyclable alkali halide wastes, while using readily available reagents to provide for cost effective alkoxysilyl-containing thiocarboxylic acid ester product.

SUMMARY OF THE INVENTION

Surprisingly, the inventors herein have discovered a method for the manufacture of alkoxysilyl-containing thiocarboxylic acid esters which avoids the aforementioned problems. Specifically, the alkoxysilyl-containing thiocarboxylic acid esters herein is made by a method comprising reacting a thioester, which does not contain an alkoxysilyl group, with an alkali metal salt, alkaline metal salt or trisubstituted ammonium salt of an alkoxysilyl-functional mercaptide or an alkoxysilyl-functional mercaptan. The trisubstituted ammonium salt is preferably based upon a trialkyl amine, to prevent reaction with the thioester to form an amide. The method described herein avoids the formation of alkali metal halides, alkaline metal halides or trisubstituted ammonium halides. While an alkali metal salt, alkaline metal salt or trisubstituted ammonium salt of a mercaptide, which does not contain an alkoxysilyl-functional group, is produced in the method herein, it can be reused to regenerate the thioester reagent.

The thioester reagent does not contain a reactive alkoxysilyl group. These thioester reagents can be prepared by recycling the alkali metal salt, alkaline metal salt or trisubstituted ammonium salt of the mercaptide, which does not contain an alkoxysilyl group. These salts can be protonated using a Brønsted-Lowry acids, preferably mercapto-functional alkoxysilanes. The mercapto-functional silane reacts with (are deprotonated by) the alkali metal salt, alkaline metal salt or trisubstituted ammonium salt of the mercaptide, to form an alkali metal salt, alkaline metal salt or trisubstituted ammonium salt of the alkoxysilyl-functional mercaptide and a mercaptan, which does not contain an alkoxysilyl group. The mercaptan, which does not contain an alkoxysilyl group, can be removed from the alkali metal salt, alkaline metal salt or trisubstituted ammonium salt of the alkoxysilyl-functional mercaptide using distillation methods, membrane separation methods or extraction methods, more specifically by distillation. The thioester reagents are prepared by reaction of the mercaptan, which does not contain an alkoxysilyl group, and a carboxylic acid. The reaction generates the non-toxic and environmentally friendly byproduct, water. Further, the present invention can employ carboxylic acid as described herein, which is much less costly than the carboxylic acid chloride or thioacid of the previous processes, which require handling phosgene or thionyl halide.

More specifically, there is provided herein a method for the manufacture of alkoxysilyl-containing thiocarboxylic acid esters of the general formula (I):

$$R^1-[C(=O)-S-R^2-SiR^3_a(OR^4)_{3-a}]_z \qquad (I)$$

where $R^1$ is a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;

each $R^2$ is independently a divalent group selected from straight chain alkyl containing from 1 to 10 carbon atoms, a branched chain alkyl containing from 3 to 10 carbon atoms, a cycloalkyl containing from 5 to 10 carbon atoms, an alkenyl containing from 2 to 10 carbon atoms, an aryl group containing from 6 to 10 carbon atoms or aralkyl containing from 7 to 10 carbon atoms;

each $R^3$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms or aralkyl containing from 7 to 10 carbon atoms;

$R^4$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms, aralkyl containing from 7 to 10 carbon atoms, a straight chain alkyl containing 2 to 6 carbon atoms and a hydroxyl group or a branched chain alkyl containing 3 to 6 carbon atoms and a hydroxyl group, an alkyl group containing at least one oxygen atom having the structure $-R^2-(OCH_2CH_2)_m(OCH_2CH(CH_3))_nOR^1$ or is a divalent group formed from two $R^4$ groups being bonded together through a covalent bond, with the provision that (i) if two $R^4$ groups are bonded together, then a is 0 or 1 and (ii) the sum of m+n is from 1 to 20;

a, m, n and z are integers wherein a is 0, 1 or 2, m is from 0 to 10, n is 0 to 10, and z is 1 or 2, and wherein the method comprises:

reacting a thioester of the general formula (II):

$$R^1[C(=O)SR^5]_z \quad \text{(II)}$$

wherein each $R^5$ is independently a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms, and wherein $R^1$ and z are as defined above, with a mercapto-functional alkoxysilane of formula (V):

$$HS-R^2-SiR^3_a(OR^4)_{3-a} \quad \text{(V), and/or}$$

an alkali metal salt, an alkaline earth metal salt, an trisubstituted ammonium salt of an alkoxysilyl-functional thiolate of the general formula (III):

$$M^+\!-\!S-R^2-SiR^3_a(OR^4)_{3-a} \quad \text{(III)}$$

where $M^+$ is an alkali metal ion, an alkaline earth metal ion, a trisubstituted ammonium ion, and $R^2$, $R^3$, $R^4$ and a are as defined above.

DETAILED DESCRIPTION OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "alkyl" means any monovalent or divalent saturated straight or branched hydrocarbon group; the term "cycloalkyl" means any monovalent or divalent cyclic saturated hydrocarbon group; and, the term "alkenyl" means any monovalent or divalent straight or branched hydrocarbon group containing one or more carbon-carbon double bonds where the site of attachment of the group can be either at a carbon-carbon double bond or elsewhere therein.

Examples of alkyls include methyl, ethyl, propyl, isopropyl, butyl and isobutyl. Examples of alkenyls include vinyl, propenyl, allyl, and methallyl. Examples of cycloalkenyls include ethylidenyl norbornane, ethylidene norbornyl, ethylidenyl norbornene and ethylidene norbornenyl.

The expressions "cycloalkyl" and "cycloalkenyl", include bicyclic, tricyclic and higher cyclic structures as well as the aforementioned cyclic structures further substituted with alkyl and/or alkenyl, groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent or divalent aromatic hydrocarbon group; and the term "aralkyl" means any monovalent or divalent alkyl group, as defined herein, in which one or more hydrogen atoms have been substituted by the same number of like and/or different aryl (as defined herein) groups. Examples of aryls include phenyl and naphthalenyl. Examples of aralkyls include benzyl and phenethyl.

In the recitation of chain lengths of the various group herein, it will be understood herein that the expression "up to" can include the lowest possible value for any chain length described herein, when such a lower endpoint of the chain length can exist, e.g., these lower end range endpoints can comprise a 1-carbon atom alkyl, i.e., methyl, a 2-carbon atom alkenyl, a 6-carbon aryl, a seven-carbon aralkyl, etc.

In the method of manufacturing the alkoxysilyl-containing thiocarboxylic acid ester described herein, the reaction Scheme A for making the alkoxysilyl-containing thiocarboxylic acid esters can be represented by the balanced chemical equation:

Scheme A

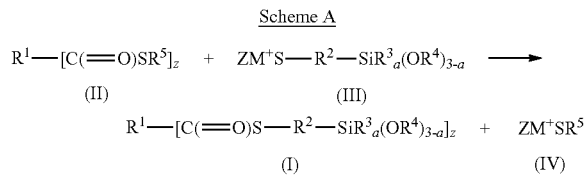

wherein $R^1$, $R^2$, $R^3$, $R^4$, $R^5$, $M^+$, a and z are as described herein. The value of the uppercase "Z" herein is understood to be a relative molar amount and is defined to have the same value as the subscript z herein, i.e., if subscript z is 1, then Z=1 and if subscript z is 2, then Z=2.

In the method of manufacturing the alkoxysilyl-containing thiocarboxylic acid ester described herein, the reaction Scheme B for making the alkoxysilyl-containing thiocarboxylic acid esters can be represented by the balanced chemical equation:

Scheme B

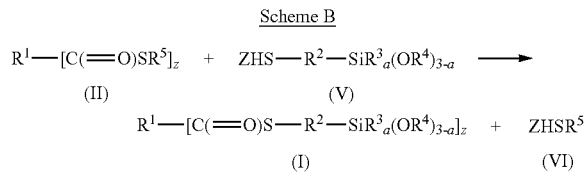

wherein $R^1$, $R^2$, $R^3$, $R^4$, $R^5$, a and z are as described herein. The value of the uppercase "Z" herein is understood to be a relative molar amount and is defined to have the same value as the subscript z herein, i.e., if subscript z is 1, then Z=1 and if subscript z is 2, then Z=2.

In the method for the manufacture of alkoxysilyl-containing thiocarboxylic acid ester of the general formula (I) as described herein, $R^1$ may more specifically be a monovalent group selected from straight chain alkyl containing from 5 to 15 carbon atoms, even more specifically containing from 5 to 9 carbon atoms and still even more specifically 7 carbon atoms, a branched chain alkyl containing from 5 to 15 carbon atoms, a straight chain alkenyl containing 5 to 15 carbon atoms, a branched chain alkenyl containing from 5 to 15 carbon atoms, or a divalent group selected from alkyl of from 2 to 10 carbon atoms, preferably 2 to 8 carbon atoms. Representative non-limiting examples of $R^1$ are monovalent pentyl, hexyl, heptyl, octyl, nonyl, decyl, 2-ethylhexyl or divalent ethyl, butyl or hexyl.

$R^2$ as described herein may more specifically be a divalent straight chain alkyl containing from 1 to 8 carbon atoms, even more specifically containing 1 to 3 carbon atoms and still more specifically 3 carbon atoms or a branched chain alkyl containing from 3 to 6 carbon atoms, even more specifically, 4 carbon atoms. Representative non-limiting examples of $R^2$ are divalent methyl, ethyl, propyl or 2-methylpropyl.

$R^3$ as described herein may more specifically be a straight chain alkyl group containing from 1 to 6 carbon atoms, a branched chain alkyl group containing from 3 to 6 carbon atoms or phenyl, or even more specifically, monovalent methyl. Representative non-limiting examples of $R^3$ are monovalent methyl, ethyl and phenyl.

$R^4$ as describe herein may more specifically be a straight chain alkyl group containing from 1 to 6 carbon atoms, a branched chain alkyl group containing from 3 to 6 carbon atoms, a straight chain alkyl group containing from 1 to 6 carbon atoms and at least one hydroxyl group or a branched chain alkyl group containing from 3 to 6 carbon atoms and at least one hydroxyl group. Representative non-limiting examples of $R^4$ are monovalent methyl, ethyl, propyl, butyl, isopropyl, isobutyl, pentyl, hexyl, 2-hydroxylethyl, 2-hydroxylpropyl, 3-hydoxyl-2-methylpropyl, 2-hydroxylbutyl, 3-hydroxylbutyl or 3-hydroxyl-1,3-dimethylbutyl, even more specifically ethyl, 3-hydoxyl-2-methylpropyl or 3-hydroxybutyl. When two $R^4$ groups are bonded together, then more specifically a divalent group is formed having from 2 to 12 carbon atoms. Representative examples of divalent groups formed from combining two $R^4$ groups together may be divalent —$CH_2CH_2$—, —$CH_2CH_2CH_2$—, —$CH_2CH(CH_3)CH_2$— or —$CH_2CH_2CH(CH_3)$—.

$R^5$ as described herein may more specifically be a monovalent straight chain alkyl group containing from 1 to 10 carbon atoms, a monovalent branched chain alkyl group containing from 3 to 10 carbon atoms, a monovalent cycloalkyl group containing from 5 to 10 carbon atoms, even more specifically a monovalent straight chain alkyl group containing from 3 to 8 carbon atoms or a branched chain alkyl group containing from 3 to 8 carbon atoms.

$M^+$ can more preferably be an alkali metal cation ion such as the non-limiting examples of sodium or potassium, preferably sodium, or a trisubstituted ammonium ion, such as triethyl ammonium, tripropyl ammonium, tri-isopropyl ammonium, piperidinium, pyridinium or the protonated 4,7,13,16,21,24-hexaoxa-1,10-diazabicyclo[8.8.8]hexacosane.

The subscripts a and z as used herein can be integers, where a is more specifically 0 or 1, preferably 0 and z is 1 or 2, more preferably 1.

In one embodiment, $R^1$ is a monovalent straight chain alkyl group containing 5 to 11 carbon atoms, a monovalent branched chain alkyl group containing 5 to 11 carbon atoms or a divalent straight chain alkyl group of from 1 to 8 carbon atoms, $R^2$ is a divalent alkyl group containing 1 to 6 carbon atoms or a branched chain alkyl group containing 3 to 6 carbon atoms, $R^3$ is methyl, $R^4$ is monovalent ethyl, 2-hydroxylethyl, 2-hydroxylpropyl, 3-hydoxyl-2-methylpropyl, 2-hydroxylbutyl, 3-hydroxylbutyl or 3-hydroxyl-1,3-dimethylbutyl or where two $R^4$ are bonded together to form a divalent group —$R^4$—$R^4$— having the structure —$CH_2CH_2CH_2$—, —$CH_2CH(CH_3)CH_2$— or —$CH_2CH_2CH(CH_3)$—, $R^5$ is a monovalent straight chain alkyl group of from 4 to 8 carbon atoms, a monovalent branched chain alkyl group of from 4 to 8 carbon atoms or a monovalent cycloalkyl group of from 5 to 8 carbon atoms, $M^+$ is sodium ion, a is 0 or 1, preferable 0, and z is 1 or 2, preferably 1.

The alkoxysilyl-containing thiocarboxylic acid esters of the general formula (I) as described herein can be selected from the group consisting of 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl-1-ethyl)-4-thioacetylnorbornene; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctanoate; 3-triethoxysilyl-1-propyl thiopalmitate; 3-triethoxysilyl-1-propyl thiooctanoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; bis-(3-triethoxysilyl-1-propyl) dithiophthalate; bis-(3-triethoxysilyl-1-propyl) dithio-iso-phthalate; bis-(3-triethoxysilyl-1-propyl) dithiotere-phthalate; bis-(3-triethoxysilyl-1-propyl) dithiosuccinate, bis-(3-triethoxysilyl-1-propyl) dithiooxalate; bis-(3-triethoxysilyl-1-propyl) dithiosebacate, bis-(3-triethoxysilyl-1-propyl) dithioadipate; thioacetic acid S-(2-methyl-[1,3,2]dioxasilinan-2-ylmethyl) ester; thioacetic acid S-(2-ethoxy-[1,3,2]dioxasilinan-2-ylmethyl) ester; thioacetic acid S-(2,5-dimethyl-[1,3,2]dioxasilinan-2-ylmethyl) ester; thioacetic acid S-(2-ethoxy-5-methyl-[1,3,2]dioxasilinan-2-ylmethyl) ester, thioacetic acid S-[2-(3-hydroxypropoxy)-[1,3,2]dioxasilinan-2-ylmethyl] ester; thioacetic acid S-[2-(3-hydroxy-2-methylpropoxy)-5-methyl-[1,3,2]dioxasilinan-2-ylmethyl] ester; thioacetic acid S-[2-(3-hydroxy-2-methylpropoxy)-5-methyl-[1,3,2]dioxasilinan-2-ylmethyl] ester; thioacetic acid S-[2-(3-hydroxy-3-methylpropoxy)-4-methyl-[1,3,2]dioxasilinan-2-ylmethyl] ester; thioacetic acid S-(2-methyl-[1,3,2]dioxasilinan-2-ylpropyl) ester; thioacetic acid S-(2-ethoxy-[1,3,2]dioxasilinan-2-ylpropyl) ester; thioacetic acid S-(2,5-dimethyl-[1,3,2]dioxasilinan-2-ylpropyl) ester; thioacetic acid S-(2-ethoxy-5-methyl-[1,3,2]dioxasilinan-2-ylpropyl) ester, thioacetic acid S-[2-(3-hydroxypropoxy)-[1,3,2]dioxasilinan-2-ylpropyl] ester; thioacetic acid S-[2-(3-hydroxy-2-methylpropoxy)-5-methyl-[1,3,2]dioxasilinan-2-ylpropyl] ester; thioacetic acid S-[2-(3-hydroxy-2-methylpropoxy)-5-methyl-[1,3,2]dioxasilinan-2-ylpropyl] ester; thioacetic acid S-[2-(3-hydroxy-3-methylpropoxy)-4-methyl-[1,3,2]dioxasilinan-2-ylpropyl] ester; thiopropionic acid S-[2-(3-hydroxy-2-methylpropoxy)-5-methyl-[1,3,2]dioxasilinan-2-ylpropyl] ester; thiopentanoic acid S-[2-(3-hydroxy-2-methylpropoxy)-5-methyl-[1,3,2]dioxasilinan-2-ylpropyl] ester; thiohexanoic acid S-[2-(3-hydroxy-2-methylpropoxy)-5-methyl-[1,3,2]dioxasilinan-2-ylpropyl] ester; 2-ethyl-thiohexanoic acid S-[2-(3-hydroxy-2-methylpropoxy)-5-methyl-[1,3,2]dioxasilinan-2-ylpropyl] ester; thiooctanoic acid S-(2-methyl-[1,3,2]dioxasilinan-2-ylpropyl) ester; thiooctanoic acid S-(2-ethoxy-[1,3,2]dioxasilinan-2-ylpropyl) ester; thiooctanoic acid S-(2,5-dimethyl-[1,3,2]dioxasilinan-2-ylpropyl) ester; thiooctanoic acid S-(2-ethoxy-5-methyl-[1,3,2]dioxasilinan-2-ylpropyl) ester, thiooctanoic acid S-[2-(3-hydroxypropoxy)-[1,3,2]dioxasilinan-2-ylpropyl] ester; thiooctanoic acid S-[2-(3-hydroxy-2-methylpropoxy)-5-methyl-[1,3,2]dioxasilinan-2-ylpropyl] ester; thiooctanoic acid S-[2-(3-hydroxy-2-methylpropoxy)-5-methyl-[1,3,2]dioxasilinan-2-ylpropyl] ester; thiooctanoic acid S-[2-(3-hydroxy-3-methylpropoxy)-4-methyl-[1,3,2]dioxasilinan-2-ylpropyl] ester; thioacetic acid S-(2,4-dimethyl-[1,3,2]dioxasilolan-2-ylmethyl) ester; thioacetic acid S-(2,4-dimethyl-[1,3,2]dioxasilolan-2-ylpropyl) ester; thiooctanoic acid S-(2,4-dimethyl-[1,3,2]dioxasilolan-2-ylpropyl) ester and combinations thereof.

The thioester of the general formula (II) as described herein can be selected from the group consisting of methylthioacetate, ethylthioacetate, allylthioacetate, propylthioacetate, butylthioacetate, pentathioacetate, hexylthioacetate, cyclohexylthioacetate, phenylthioacetate, benzylthioacetate, methylthiooctanoate, ethylthiooctanoate, allylthiooctanoate, propylthiooctanoate, butylthiooctanoate, pentathiooctanoate, hexylthiooctanoate, cyclohexylthiooctanoate, phenylthiooctanoate, benzylthiooctanoate, hexylthioadipate, cyclohexylthioadipate, phenylthioadipate, benzylthioadipate, and combinations thereof.

The mercapto-functional alkoxysilane can be selected from the group consisting of (3-mercaptopropyl)trimethoxysilane, (3-mercaptopropyl)triethoxysilane, (3-mercaptopropyl)dimethoxymethylsilane, (3-mercaptopropyl)diethoxymethylsilane, (3-mercaptopropyl)dimethyl(methoxy) silane, (3-mercaptopropyl)dimethyl(ethoxy)silane, (2-mercaptoethyl)trimethoxysilane, (2-mercaptoethyl)triethoxysilane, (2-mercaptoethyl)dimethoxymethylsilane, (2-mercaptoethyl)diethoxymethylsilane, (2-mercaptoethyl)dimethyl(methoxy)silane, (2-mercaptoethyl)dimethyl(ethoxy)silane, 2-methyl-[1,3,2]dioxasilinan-2-ylmethyl mercaptan, 2-ethoxy-[1,3,2]dioxasilinan-2-ylmethyl mercaptan, 2,5-dimethyl-[1,3,2]dioxasilinan-2-ylmethyl mercaptan. 2-ethoxy-5-methyl-[1,3,2]dioxasilinan-2-ylmethyl mercaptan, 2-(3-hydroxypropoxy)-[1,3,2]dioxasilinan-2-ylmethyl mercaptan, 2-(3-hydroxy-2-methylpropoxy)-5-methyl-[1,3,2]dioxasilinan-2-ylmethyl mercaptan, 2-(3-hydroxy-2-methylpropoxy)-5-methyl-[1,3,2]dioxasilinan-2-ylmethyl mercaptan, 2-(3-hydroxy-3-methylpropoxy)-4-methyl-[1,3,2]dioxasilinan-2-ylmethyl mercaptan, 2-methyl-[1,3,2]dioxasilinan-2-ylpropyl mercaptan, 2-ethoxy-[1,3,2]dioxasilinan-2-ylpropyl mercaptan, 2,5-dimethyl-[1,3,2]dioxasilinan-2-ylpropyl mercaptan, 2-ethoxy-5-methyl-[1,3,2]dioxasilinan-2-ylpropyl mercaptan, 2-(3-hydroxypropoxy)-[1,3,2]dioxasilinan-2-ylpropyl mercaptan, 2-(3-hydroxy-2-methylpropoxy)-5-methyl-[1,3,2]dioxasilinan-2-ylpropyl mercaptan, 2-(3-hydroxy-2-methylpropoxy)-5-methyl-[1,3,2]dioxasilinan-2-ylpropyl mercaptan, 2-(3-hydroxy-3-methylpropoxy)-4-methyl-[1,3,2]dioxasilinan-2-ylpropyl mercaptan and combinations thereof.

The alkali metal salt, an alkaline earth metal salt, an trisubstituted ammonium salt of an alkoxysilyl-functional thiolate of formula (III) can be selected from the group consisting of sodium 3-trimethoxysilylpropanethiolate, sodium 3-triethoxysilylpropanethiolate, sodium 3-diethoxymethylsilylpropanethiolate, sodium trimethoxysilylmethanethiolate, sodium 3-[2-(3-hydroxy-3-methylpropoxy)-4-methyl-[1,3,2]dioxasilinan-2-yl]propanethiolate, sodium 3-[2-(3-hydroxy-2-methylpropoxy)-5-methyl-[1,3,2]dioxasilinan-2-yl]propanethiolate, sodium 3-[2-ethoxy-5-methyl-[1,3,2]dioxasilinan-2-yl]propanethiolate, sodium 3-(2,4-dimethyl-[1,3,2]dioxasilolan-2-yl)propanethiolate, potassium 3-trimethoxysilylpropanethiolate, potassium 3-triethoxysilylpropanethiolate, potassium 3-diethoxymethylsilylpropanethiolate, potassium trimethoxysilylmethanethiolate, potassium 3-[2-(3-hydroxy-3-methylpropoxy)-4-methyl-[1,3,2]dioxasilinan-2-yl]propanethiolate, potassium 3-[2-(3-hydroxy-2-methylpropoxy)-5-methyl-[1,3,2]dioxasilinan-2-yl]propanethiolate, potassium 3-[2-ethoxy-5-methyl-[1,3,2]dioxasilinan-2-yl]propanethiolate, sodium 3-(2,4-dimethyl-[1,3,2]dioxasilolan-2-yl)propanethiolate, trimethylammonium 3-trimethoxysilylpropanethiolate, triethylammonium 3-triethoxysilylpropanethiolate, tri-isopropylammonium 3-diethoxymethylsilylpropanethiolate, trimethylammonium trimethoxysilylmethanethiolate, triethylammonium 3-[2-(3-hydroxy-3-methylpropoxy)-4-methyl-[1,3,2]dioxasilinan-2-yl]propanethiolate, tri-isopropylammonium 3-[2-(3-hydroxy-2-methylpropoxy)-5-methyl-[1,3,2]dioxasilinan-2-yl]propanethiolate, tri-isopropylammonium 3-[2-ethoxy-5-methyl-[1,3,2]dioxasilinan-2-yl]propanethiolate, trimethylammonium 3-(2,4-dimethyl-[1,3,2]dioxasilolan-2-yl)propanethiolate and combinations thereof.

The an alkali metal salt, an alkaline earth metal salt, an trisubstituted ammonium salt of a alkoxy-functional thiolate of the general formula (III), wherein $M^+$ is an alkali metal ion, alkaline earth metal ion, trisubstituted ammonium ion can be obtained through deprotonation of the mercaptosilane or other methods known to those skilled in the art, such as those described in U.S. Pat. No. 6,777,569, the entire contents of which are incorporated by reference herein.

It is understood herein that mercapto-functional alkoxysilane of formula (V) or the alkoxysilyl-functional thiolate of formulate (III) as described herein can also comprise a combination of one or more mercapto-functional alkoxysilane of formula (V), one or more alkoxysilyl-functional thiolates of formula (III) or one or more mercapto-functional alkoxysilane of formula (V) and one or more alkoxysilyl-functional thiolates of formula (III).

In one embodiment herein, the method for preparing alkoxysilyl-containing thiocarboxylic acid esters of the general formula (I):

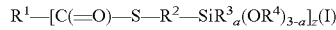

where $R^1$ is a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;

each $R^2$ is independently a divalent group selected from straight chain alkyl containing from 1 to 10 carbon atoms, a branched chain alkyl containing from 3 to 10 carbon atoms, a cycloalkyl containing from 5 to 10 carbon atoms, an alkenyl containing from 2 to 10 carbon atoms, an aryl group containing from 6 to 10 carbon atoms or aralkyl containing from 7 to 10 carbon atoms;

each $R^3$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms or aralkyl containing from 7 to 10 carbon atoms;

$R^4$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms, aralkyl containing from 7 to 10 carbon atoms, a straight chain alkyl containing 2 to 6 carbon atoms and a hydroxyl group or a branched chain alkyl containing 3 to 6 carbon atoms and a hydroxyl group, and alkyl group containing at least one oxygen atom having the structure $-R^2-(OCH_2CH_2)_m(OCH_2CH(CH_3))_nOR^1$ or a divalent group formed from two $R^4$ groups being bonded together through a covalent bond, with the provisos that (i) if two $R^4$ groups are bonded together, then a is 0 or 1 and (ii) the sum of m+n is from 1 to 20;

a, m, n and z are integers wherein a is 0, 1 or 2, m is from 0 to 10, n is from 0 to 10, and z is 1 or 2, comprising
(a) contacting a thioester of the general formula (II):

wherein
each $R^5$ is independently a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms, and wherein $R^1$ and z are as defined above, with a mercapto-functional alkoxysilane of formula (V):

an alkali metal salt, an alkaline earth metal salt, an trisubstituted ammonium salt of an alkoxysilyl-functional thiolate of the general formula (III):

where $M^+$ is an alkali metal ion, an alkaline earth metal ion, an trisubstituted ammonium ion, and $R^2$, $R^3$, $R^4$ and a are as defined above;
(b) reacting the thioester with the mercapto-functional alkoxysilane and/or alkali metal salt, an alkaline earth metal salt or an trisubstituted ammonium salt of an alkoxysilyl-functional thiolate of step (a) to produce a mixture of alkoxysilyl-containing thiocarboxylic acid ester having the formula (I) and byproduct $HSR^5$ of formula (VI) and/or $M^{+-}SR^5$ of formula (IV);
(c) removing the byproduct $HSR^5$ and/or $M^{+-}SR^5$ from the mixture of step (b);
(d) optionally, further treating the mixture of step (c) containing alkoxysilyl-containing thiocarboxylic acid ester, to provide for an alkoxysilyl-containing thiocarboxylic acid ester; and
(a) optionally, using the byproduct $HSR^5$ and/or $M^{+-}SR^5$ of step (c) to prepare the thioester $R^1[C(=O)SR^5]_z$ of the general formula (II), which is used in step (a).

In one embodiment herein, step (a) does not contain a mercapto-functional alkoxysilane in the reaction mixture. The reaction of the thioester of formula (II) with the alkali metal salt, an alkaline earth metal salt or a trisubstituted ammonium salt of an alkoxysilyl-functional thiolate of formula (III) provides for the alkoxysilyl-containing thiocarboxylic acid esters of the general formula (I) and the byproduct alkali metal salt, an alkaline earth metal salt or trisubstituted ammonium salt of a thiolate having the formula (IV), as is described by the chemical equation (A).

The alkoxysilyl-functional thiolate of formula (III) may be formed by the reaction of the mercapto-functional alkoxysilane with an alkali metal, alkaline earth metal, alkali metal hydride, an alkaline earth metal hydride, or a base selected from the group consisting of metal hydroxides, metal alkoxides, metal amides, metal thiolates, and amines, examples of which are known to those skilled in the art. Alkali metals useful in deprotonating the mercapto-functional alkoxysilane are sodium and potassium. Some specific examples of alkaline metal hydroxide or an alkaline metal alkoxide can be found, for example, in U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the contents of all of which are incorporated by reference herein in their entireties.

Some non-limiting examples of alkali metal, alkali metal hydrides and alkali metal alkoxides or hydroxides include sodium, potassium, sodium hydride, potassium hydride, cesium hydroxide, rubidium hydroxide, potassium hydroxide, potassium methoxide, potassium ethoxide, potassium tert-butoxide, sodium hydroxide, sodium methoxide, sodium ethoxide and sodium tert-butoxide.

In one embodiment, the alkali metal salt, alkaline earth metal salt or trisubstituted ammonium salt of an alkoxysilyl-functional thiolate of formula (III) is soluble in the reaction mixture, while the alkali metal salt, alkaline earth metal salt or trisubstituted ammonium salt of a thiolate having the formula (IV) is insoluble in the reaction mixture. The insoluble alkali metal salt, alkaline earth metal salt or trisubstituted ammonium salt of a thiolate precipitates from the reaction mixture, thereby driving the equilibrium reaction of chemical equation (A) to completion. The insoluble alkali metal salt, alkaline earth metal salt or trisubstituted ammonium salt of a thiolate precipitate can be removed from the reaction mixture using decantation, filtration, centrifusion or washing methods.

The alkoxysilyl group bonded to the alkali metal salt, alkaline earth metal salt or trisubstituted ammonium salt of an alkoxysilyl-functional thiolate increases its solubility in the reaction mixture. The solubility of the alkali metal salt, alkaline earth metal salt or trisubstituted ammonium salt of an alkoxysilyl-functional thiolate is affected by $R^4$, specifically when $R^4$ is greater than one carbon atom, more specifically when $R^4$ is a straight chain alkyl containing from 2 to 6 carbon atoms or a branched chain alkyl containing from 3 to 6 carbon atoms and even more specifically ethyl.

The $R^5$ group and $M^+$ on the byproduct alkali metal salt, an alkaline earth metal salt or trisubstituted ammonium salt of a thiolate may affect its solubility in the reaction mixture. Specifically, $R^5$ of the byproduct alkali metal salt, an alkaline earth metal salt or trisubstituted ammonium salt of a thiolate is a straight chain alkyl group of from 1 to 10 carbon atoms, more specifically from 1 to 6 carbon atoms. When $M^+$ is an alkali metal ion, specifically sodium or potassium, and more specifically sodium, the solubility in the reaction mixture may be decreased. Preferably, $R^5$ is a straight chain alkyl group of from 1 to 6 carbon atoms and $M^+$ is sodium or potassium.

Organic solvents can be used to decrease the solubility of the byproduct alkali metal salt, an alkaline earth metal salt or trisubstituted ammonium salt of a thiolate in the reaction mixture. Non-protonic solvent may be used to lower the solubility of the byproduct alkali metal salt, alkaline earth metal salt or trisubstituted ammonium salt of a thiolate in the reaction mixture. Specifically, the solvents may be hydrocarbons, esters, ketones or ethers, more specifically hydrocarbons. Representative and non-limiting solvent include alkanes, cycloalkanes and aromatic compounds, such as hexane, heptane, octane, decane, 2-methylpentane, 2-methylnonane, cyclopentane, cyclohexane, cyclooctane, benzene, toluene, xylenes and mixtures thereof.

The amount of solvent in the reaction mixture may be from 1 to 50 weight percent, more specifically 2 to 20 weight percent, and even more specifically 5 to 15 weight percent, based on the weight of the initial weights of the alkali metal salt, alkaline earth metal salt or trisubstituted ammonium salt of an alkoxysilyl-functional thiolate and thioacid ester reagents.

The byproduct alkali metal salt, alkaline earth metal salt or trisubstituted ammonium salt of a thiolate may also be removed from the reaction mixture by adding a Brønsted-Lowry acid to protonate the thiolate anion, and then removing the thiol by distillation or stripping. Representative Brønsted-Lowry acid include strong acids, such as hydrogen chloride, sulfuric acid, paratoluene sulfonic acid, trifluoromethyl sulfonic acid, carboxylic acids and mercapto-functional alkoxysilane. The Brønsted-Lowry acid may be added to the reaction mixture containing the thiolate byproduct or the thiolate byproduct after separation from the reaction mixture. The thiol formed from the neutralization of the thiolate byproduct may be separated from the salt of the Brønsted-Lowry acid and used to make the thiocarboxylic acid ester reagent.

A particularly useful Brønsted-Lowry acid is mercapto-functional alkoxysilanes of formula (V). The neutralized mercapto-functional alkoxysilanes is the alkali metal salt, alkaline earth metal salt or trisubstituted ammonium salt of the alkoxysilyl-functional thiolate of formula (III), which can be used in the preparation of the alkoxysilyl-functional thiocarboxylic acid ester of formula (I). The thiol formed from the neutralization reaction may be separated from the alkali metal salt, alkaline earth metal salt or trisubstituted ammonium salt of the alkoxysilyl-functional thiolate of formula (III) by stripping or distillation. The distillation is facilitated if the boiling point of the thiol is lower than the boiling point of the mercapto-functional alkoxysilane and/or thioester specifically the boiling point is less than 5° C. at an atmospheric pressure of 1.013 bar, more specifically less than 50° C. at 1.013 bar and even more specifically, less than 100° C. at 1.013 bar than the boiling point of the mercapto-functional alkoxysilane.

The byproduct alkali metal salt, alkaline earth metal salt or trisubstituted ammonium salt of a thiolate may also be removed from the reaction mixture by washing the reaction mixture with an aqueous solution. The aqueous solution may be buffered or contains salts to decrease the solubility of the reaction products in the aqueous phase, thereby forming a two-phase mixture. The two-phase mixture can be separated from each other through centrifusion or decantation methods. Representative non-limiting aqueous solutions include sodium carbonate solutions and brine solutions.

Once separated from the reaction products, the aqueous phase containing byproduct alkali metal salt, alkaline earth metal salt or trisubstituted ammonium salt of a thiolate can be neutralized with acids to form the thiol compounds, which may form a two-phase mixture. The thiol can be removed from the aqueous phase by stripping, distillation, decantation for centrifusion methods.

The amount of the alkali metal salt, alkaline earth metal salt or trisubstituted ammonium salt of the alkoxysilyl-functional thiolate used in the reaction can be less than, equal to or greater than stoichiometric amounts relative to the thioester of formula (II). Specifically, the amount of the alkali metal salt, alkaline earth metal salt or trisubstituted ammonium salt of the alkoxysilyl-functional thiolate of formula (III) is from about 0.5 to about 1.5 equivalents based upon the thioester of formula (II), more specifically about 0.9 to about 1.2 equivalents based upon the thioester and even more specifically 0.95 to 1.05 equivalents based upon the thioester.

The reaction of the thioester with the alkali metal salt, alkaline earth metal salt or trisubstituted ammonium salt of the alkoxysilyl-functional thiolate can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

In another embodiment, step (a) does not contain an alkali metal salt, alkaline earth metal salt or trisubstituted ammonium salt of the alkoxysilyl-functional thiolate in the reaction mixture. The reaction of the thioester of formula (II) with the mercapto-functional alkoxysilane of formula (V) provides for the alkoxysilyl-containing thiocarboxylic acid ester of formula (I) and the byproduct thiol of formula (VI), as described the balance reaction of chemical equation (B). The reaction is preferably conducted in the presence of a catalyst.

The catalyst that may be employed can be an acid. The acid can be a Brønsted-Lowry acid or a Lewis acid. Because the reaction may be described as a transesterification reaction, the Brønsted-Lowry acid or a Lewis acid function as a transesterification catalyst. Suitable Brønsted-Lowry acid catalysts are protic acids, preferably Brønsted-Lowry acid catalysts whose $pK_a$ are below 5.0 in aqueous solution. The pKa values for Brønsted-Lowry acid catalysts are reported in the CRC Handbook of Chemistry and Physics, $72^{nd}$ edition, D. R. Lide (ed), CRC Press, Boston (1991), 8-39 to 8-41. If the pKa of the acid is not reported, the value can be determined using a potentiometric titration method, Albert, A. & Sergeant, E. P., Ionization Constants of Acids and Bases, Wiley, Inc., New York, 1962.

Representative non-limiting examples of Brønsted-Lowry acid catalysts include sulfuric acid, phosphoric acid, trifluoromethanesulfonic acid, toluenesulfonic acid, trifluoroacetic acid, acetic acid and hydrochloric acid.

Lewis acids such as metal salts or metal complexes may be used as catalysts. The metal salts or metal complexes may be derived from tin, titanium, zirconium, bismuth, iron, nickel, cobalt and aluminum. Representative non-limiting examples of Lewis acid catalysts may include dibutyl tin dilaurate, dioctyl tin dilaurate, dibutyl tin diacetate, dibutyl tin oxide, tetraethyl titanate, tetraethyl zirconate, zirconium tetrafluoride, zirconium tetrachloride, zirconium acetoacetonate, zirconium acetate, aluminum chloride and bismuth acetate.

In one embodiment, the amount of Brønsted-Lowry acid catalysts or Lewis acid catalysts is from about 0.001 to about 10 weight percent, more specifically, from about 0.1 to about 2 weight percent, based on the initial weight of the mercapto-functional alkoxysilane.

The catalyst used in the reaction of chemical equation (B) may be removed to improve the hydrolytic stability of the alkoxysilyl-functional thiocarboxylic acid ester product of formula (I). The acid catalysts can be neutralized by a base or simply washed away. Water, brine, sodium carbonate aqueous solution and sodium phosphate monobasic aqueous solution are used as washing media, wherein the preferred washing media is sodium phosphate monobasic aqueous solution.

In still another embodiment, the byproduct thiol of formula (VI) is removed from the reaction mixture, thereby driving the equilibrium reaction of chemical reaction (B) to completion. The thiol may be removed from the reaction mixture by stripping or distillation. The distillation is facilitated if the boiling point of the thiol is lower than the boiling point of the mercapto-functional alkoxysilane. Specifically, the boiling point of the thiol is less than about 5° C. at an atmospheric pressure of about 1.013 bar, more specifically less than about 50° C. at about 1.013 bar and even more specifically, less than about 100° C. at about 1.013 bar than the boiling point of the mercapto-functional alkoxysilane.

The amount of the mercapto-functional alkoxysilane of formula (V) used in the reaction can be less than, equal to or greater than stoichiometric amounts relative to the thiol ester of formula (II). Specifically, the amount of mercapto-functional alkoxysilane of formula (V) is from about 0.5 to about 1.5 equivalents based upon the thioester of formula (II), more specifically about 0.9 to about 1.2 equivalents based upon the thioester and even more specifically about 0.95 to about 1.05 equivalents based upon the thioester.

The reaction of the thioester with the mercapto-functional alkoxysilane can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

The reaction of the thioester with the mercapto-functional alkoxysilane can be carried out in the presence of organic solvents. The solvents are particularly useful if they form low boiling azeotropes with the thiol, thereby facilitating the removal from the reaction mixture by distillation or stripping.

In still yet another embodiment, the step (a) contains both mercapto-functional alkoxysilane of formula (V) and the alkali metal salt, an alkaline earth metal salt or an trisubstituted ammonium salt of an alkoxysilyl-functional thiolate of formula (III) in the reaction mixture. The reaction of the thioester of formula (II) with the alkali metal salt, an alkaline earth metal salt or an trisubstituted ammonium salt of an alkoxysilyl-functional thiolate of formula (III) may be faster than the reaction of the thioester with the mercapto-functional alkoxysilane. The alkoxysilyl-containing thiocarboxylic acid esters of the general formula (I) and the byproduct alkali metal salt, an alkaline earth metal salt or trisubstituted ammonium salt of a thiolate having the formula (IV), are formed primarily through the reaction described by the chemical equation (A).

In one embodiment herein, the method for preparing alkoxysilyl-containing thiocarboxylic acid esters of the general formula (I), comprises (a) contacting a thioester of the general formula (II):

$$R^1[C(\!\!=\!\!O)SR^5]_z \quad \quad (II)$$

wherein
each $R^5$ is independently a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms, and
wherein $R^1$ and z are as defined above, with a mercapto-functional alkoxysilane of formula (V):

$$HS\text{---}R^2\text{---}SiR^3_a(OR^4)_{3-a} \quad \quad (V), and$$

an alkali metal salt, an alkaline earth metal salt, a trisubstituted ammonium salt of an alkoxysilyl-functional thiolate of the general formula (III):

$$M^{+-}S—R^2—SiR^3{}_a(OR^4)_{3-a} \quad (III)$$

where $M^+$ is an alkali metal ion, an alkaline earth metal ion, a trisubstituted ammonium ion and $R^2$, $R^3$, $R^4$ and a are as defined above;

(b) reacting the thioester with the alkali metal salt, an alkaline earth metal salt or a trisubstituted ammonium salt of an alkoxysilyl-functional thiolate of step (a) to produce a mixture of alkoxysilyl-containing thiocarboxylic acid ester having the formula (I) and byproduct $M^{+-}SR^5$ of formula (IV);

(b1) reacting the byproduct $M^{+-}SR^5$ of step (b) with the mercapto-functional alkoxysilane of formula (V) to form the alkali metal salt, an alkaline earth metal salt, a trisubstituted ammonium salt of an alkoxysilyl-functional thiolate $M^{+-}S—R^2—SiR^3{}_a(OR^4)_{3-a}$ of the general formula (III) and the byproduct $HSR^5$ of formula (VI);

(c) removing the byproduct $HSR^5$ from the mixture of step (b1);

(d) optionally, further treating the mixture of step (c) containing alkoxysilyl-containing thiocarboxylic acid ester, to provide for an alkoxysilyl-containing thiocarboxylic acid ester; and (e) optionally, using the byproduct $HSR^5$ of step (c) to prepare the thioester $R^1[C(=O)SR^5]_z$ of the general formula (II), which is used in step (a).

In one embodiment, the method for preparing alkoxysilyl-containing thiocarboxylic acid esters of the general formula (I) may be a batch process, a semi-batch process or a continuous process.

The amount of the alkali metal salt, alkaline earth metal salt or trisubstituted ammonium salt of the alkoxysilyl-functional thiolate used in the reaction can be less than stoichiometric amount relative to the thioester of formula (II) because the alkali metal salt, alkaline earth metal salt or trisubstituted ammonium salt of the alkoxysilyl-functional thiolate is constantly being generate from the reaction of the mercapto-functional alkoxysilane with the byproduct, alkali metal salt, alkaline earth metal salt or trisubstituted ammonium salt of the thiolate. Specifically, the amount of the alkali metal salt, alkaline earth metal salt or trisubstituted ammonium salt of the alkoxysilyl-functional thiolate of formula (III) is from about 0.001 to about 0.9 equivalents based upon the thioester of formula (II), more specifically about 0.01 to about 0.5 equivalents based upon the thioester and even more specifically about 0.01 to about 0.3 equivalents based upon the thioester.

In another embodiment, the molar ratio of the alkali metal salt, alkaline earth metal salt or trisubstituted ammonium salt of the alkoxysilyl-functional thiolate of formula (III) to the mercapto-functional alkoxysilane of formula (V) used in the reaction is from about 0.00065 to about 1.5, more specifically from about 0.0065 to about 0.5, and even more specifically from about 0.0065 to about 0.25.

The reaction of the thioester with the alkali metal salt, alkaline earth metal salt or trisubstituted ammonium salt of the alkoxysilyl-functional thiolate when carried out in the present of the mercapto-functional alkoxysilane (V) can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

In still another embodiment, the byproduct thiol of formula (VI) is removed from the reaction mixture, thereby driving the equilibrium reaction of chemical reaction (A) to completion. The thiol may be removed from the reaction mixture by stripping or distillation. The distillation is facilitated if the boiling point of the thiol is lower than the boiling point of the mercapto-functional alkoxysilane and the thiol ester. Specifically, the boiling point of the thiol is less than about 5° C. at an atmospheric pressure of about 1.013 bar, more specifically less than about 50° C. at about 1.013 bar and even more specifically, less than about 100° C. at about 1.013 bar than the boiling point of the mercapto-functional alkoxysilane and the thiol ester.

The reaction of the thioester with the mercapto-functional alkoxysilane can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

The reaction of the thioester with the mercapto-functional alkoxysilane can be carried out in the presence of organic solvents. The solvents are particularly useful if they form low boiling azeotropes with the thiol, thereby facilitating the removal from the reaction mixture by distillation or stripping.

In another embodiment, the method for preparing alkoxysilyl-containing thiocarboxylic acid esters is a continuous method. The continuous method for preparing of the alkoxysilyl-containing thiocarboxylic acid esters of general formula (I) may comprise:

(a) contacting continuously the thioester of the general formula (II) with the mercapto-functional alkoxysilane of formula (V) and an alkali metal salt, an alkaline earth metal salt, a trisubstituted ammonium salt of an alkoxysilyl-functional thiolate of the general formula (III) by continuous adding thioester of the general formula (II), the mercapto-functional alkoxysilane of formula (V) and the alkali metal salt, an alkaline earth metal salt, a trisubstituted ammonium salt of an alkoxysilyl-functional thiolate of the general formula (III) into a first reaction vessel;

(b) continuously reacting the thioester with the alkali metal salt, an alkaline earth metal salt or a trisubstituted ammonium salt of an alkoxysilyl-functional thiolate of step (a) in the first reaction vessel to produce an alkoxysilyl-containing thiocarboxylic acid ester having the formula (I) and byproduct the alkali metal salt, an alkaline earth metal salt or a trisubstituted ammonium salt of thiolate of formula (IV);

(b1) continuously reacting the byproduct the alkali metal salt, an alkaline earth metal salt or a trisubstituted ammonium salt of thiolate of formula (IV) formed step (b) with the mercapto-functional alkoxysilane of formula (V) to form the alkali metal salt, an alkaline earth metal salt, a trisubstituted ammonium salt of an alkoxysilyl-functional thiolate of the formula (III) and the byproduct thiol of formula (VI), in the first reaction vessel, wherein the reactions of step (b) and (b1) form a reaction mixture containing the product, alkoxysilyl-containing thiocarboxylic acid ester having the formula (I), the reactants, thioester of the general formula (II), alkali metal salt, an alkaline earth metal salt, a trisubstituted ammonium salt of an alkoxysilyl-functional thiolate of the general formula (III) and the mercapto-functional alkoxysilane of formula (V), and the byproducts, an alkali metal salt, an alkaline earth metal salt, a trisubstituted ammonium salt of thiolate of formula (IV) and thiol of formula (VI);

(c) continuously removing the reaction mixture of step (b1) from the first reaction vessel and transferring the reaction mixture to a distillation apparatus;

(c1) continuously separating the thiol of formula (VI) from the other components in the reaction mixture of step (b1) by passing the reaction mixture through distillation apparatus, forming a separated thiol and a mixture of other components;

(c2) continuously removing a portion of the mixture of other component of step (c1);

(c3) continuously transferring a portion of the mixture of other components of step (c1) to the first reaction vessel;

(d) continuous transferring the mixture of other component of step (c1) to an second reactor for further treatment to form the product, alkoxysilyl-containing thiocarboxylic acid ester having the formula (I);

(d1) continuous transferring the reaction product of step (d) to a storage vessel;

(e) optionally, reacting the separated $HSR^5$ of step (c1) with a carboxylic acid to prepare the thioester of the general formula (II), and transfer the thioester to the first reaction vessel of step (a).

The amount of the alkali metal salt, alkaline earth metal salt or trisubstituted ammonium salt of the alkoxysilyl-functional thiolate used in the reaction can be less than stoichiometric amount relative to the thioester of formula (II) because the alkali metal salt, alkaline earth metal salt or trisubstituted ammonium salt of the alkoxysilyl-functional thiolate is constantly being generate from the reaction of the mercapto-functional alkoxysilane with the byproduct, alkali metal salt, alkaline earth metal salt or trisubstituted ammonium salt of the thiolate. Specifically, the amount of the alkali metal salt, alkaline earth metal salt or trisubstituted ammonium salt of the alkoxysilyl-functional thiolate of formula (III) is from about 0.001 to about 0.9 equivalents based upon the thioester of formula (II), more specifically about 0.01 to about 0.5 equivalents based upon the thioester and even more specifically about 0.01 to about 0.3 equivalents based upon the thioester.

In another embodiment, the molar ratio of the alkali metal salt, alkaline earth metal salt or trisubstituted ammonium salt of the alkoxysilyl-functional thiolate of formula (III) to the mercapto-functional alkoxysilane of formula (V) used in the reaction is from about 0.00065 to about 1.5, more specifically from about 0.0065 to about 0.5, and even more specifically from about 0.0065 to about 0.25.

The reaction of the thioester with the alkali metal salt, alkaline earth metal salt or trisubstituted ammonium salt of the alkoxysilyl-functional thiolate when carried out in the present of the mercapto-functional alkoxysilane (V) can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

In still another embodiment, the byproduct thiol of formula (VI) is removed from the reaction mixture, thereby driving the equilibrium reaction of chemical reaction (A) to completion. The thiol may be removed from the reaction mixture by stripping or distillation. The distillation is facilitated if the boiling point of the thiol is lower than the boiling point of the mercapto-functional alkoxysilane and the thiol ester. Specifically, the boiling point of the thiol is less than about 5° C. at an atmospheric pressure of about 1.013 bar, more specifically less than about 50° C. at about 1.013 bar and even more specifically, less than about 100° C. at about 1.013 bar than the boiling point of the mercapto-functional alkoxysilane and the thiol ester.

The reaction of the thioester with the mercapto-functional alkoxysilane can be carried out at temperatures of from about 15° C. to about 200° C., more specifically of from about 25° C. to about 150° C. and even more specifically from about 40° C. to about 100° C., and at pressures of from about 0.001 bar to about 2 bar, more specifically from about 0.1 bar to about 1.2 bars and even more specifically from about 0.75 bar to about 1.1 bars.

The reaction of the thioester with the mercapto-functional alkoxysilane can be carried out in the presence of organic solvents. The solvents are particularly useful if they form low boiling azeotropes with the thiol, thereby facilitating the removal from the reaction mixture by distillation or stripping.

In yet still another embodiment, R is a monovalent straight chain alkyl group or branched chain alkyl group having 5 to 11 carbon atoms, $R^2$ is a divalent straight chain alkyl group of from 1 to 3 carbon atoms, $R^3$ is methyl $R^4$ is a monovalent straight chain alkyl group or branched chain alkyl group of from 2 to 4 carbon atoms or two $R^4$ groups are bonded together to form a divalent —$R^4$—$R^4$— group, a is an integer of 0 or 1, and z is 1.

The first reaction vessel may be a continuous stirred reactor, a tube reactor with static mixing, a tube reactor with dynamic stirring, more specifically a continuous stirred reactor. The second reaction vessel may be a continuous stirred reactor, a tube reactor with static mixing, a tube reactor with dynamic stirring, a decantor or a centrifuge, more specifically a continuous stirred reactor equipped with a decantor, filter or stripper.

The distillation apparatus may be a kettle equipped with a fractionation column, a wipe-film evaporator or a thin film evaporator.

The further treatment of step (c2) may be a neutralization of the alkali metal salt, alkaline earth metal salt, trisubstituted ammonium salt of the alkoxysilyl-functional thiolate of the general formula (III) and of the alkali metal salt, an alkaline earth metal salt, a trisubstituted ammonium salt of thiolate of formula (IV) with a Brønsted-Lowry acid, optionally followed by a filtration step and a stripping step, or a washing step with water, brine solution or aqueous buffered solutions to extract the alkali metal salt, alkaline earth metal salt, trisubstituted ammonium salt of the alkoxysilyl-functional thiolate of the general formula (III) and of the alkali metal salt, an alkaline earth metal salt, a trisubstituted ammonium salt of thiolate of formula (IV) from the mixture.

In one embodiment, the thiol of the general formula (VI) can be reacted with a carboxylic acid of the general formula (VII):

$$R^1(COOH)_z \quad\quad\quad (VII)$$

wherein $R^1$ and z are as defined herein, and wherein such a reaction can regenerate a thioester of the general formula (II) as defined in the method described herein. It will be understood that while a thiol of the formula (VI) can be directly reacted with the carboxylic acid component (VII) herein, an alkali metal salt, and alkaline earth metal salt or trisubstituted ammonium salt of a thiolate of the formula (IV) would first be acidified, e.g., by reaction with a strong acid, such as HCl sulfuric acid, or other known strong acids, to form a thiol of the formula (VI), which thiol can then subsequently be reacted with a carboxylic acid as is described above, and also as described in the following general chemical equation (C):

Scheme C

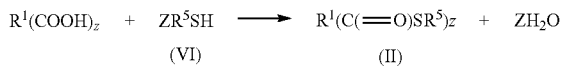

wherein $R^1$, $R^5$, M and z are as defined herein.

Some non-limiting examples of suitable carboxylic acids of the general formula (VII) are those selected from the group consisting of acetic acid, propionic acid, butyric acid, valeric acid, isovaleric acid, pivalic acid, neopentanoic acid, caproic acid, enanthic acid, caprylic acid, pelargonic acid, 2-ethylhexanoic acid, Versatic™ acids, especially neo-nonanoicacid and neodecanoic acid (e.g. VeoVa™ vinyl ester of Versatic acid), capric acid, neoundecanoic acid, lauric acid, tridecanoic acid, myristic acid, pentadecanoic acid, palmitic acid, margaric acid, stearic acid, nonadecanoic acid, succinic acid, arachidic acid and combinations thereof.

The reaction may be carried out in the presence of acid catalysts, dehydrating agents or moisture scavengers.

The catalyst that may be employed can be an acid. The acid can be a Brønsted-Lowry acid or a Lewis acid. Because the reaction may be described as a transesterification reaction, the Brønsted-Lowry acid or a Lewis acid function as a transesterification catalyst. Suitable Brønsted-Lowry acid catalysts are protic acids, preferably Brønsted-Lowry acid catalysts whose $pK_a$ are below 5.0 in aqueous solution. The pKa values for Brønsted-Lowry acid catalysts are reported in the CRC Handbook of Chemistry and Physics, $72^{nd}$ edition, D. R. Lide (ed), CRC Press, Boston (1991), 8-39 to 8-41. If the pKa of the acid is not reported, the value can be determined using a potentiometric titration method, Albert, A. & Sergeant, E. P., Ionization Constants of Acids and Bases, Wiley, Inc., New York, 1962.

Representative non-limiting examples of Brønsted-Lowry acid catalysts include sulfuric acid, phosphoric acid, trifluoromethanesulfonic acid, toluenesulfonic acid, trifluoroacetic acid, acetic acid and hydrochloric acid.

Lewis acids such as metal salts or metal complexes may be used as catalysts. The metal salts or metal complexes may be derived from tin, titanium, zirconium, bismuth, iron, nickel, cobalt and aluminum. Representative non-limiting examples of Lewis acid catalysts may include dibutyl tin dilaurate, dioctyl tin dilaurate, dibutyl tin diacetate, dibutyl tin oxide, tetraethyl titanate, tetraethyl zirconate, zirconium tetrafluoride, zirconium tetrachloride, zirconium acetoacetonate, zirconium acetate, aluminum chloride and bismuth acetate.

In one embodiment, the amount of Brønsted-Lowry acid catalysts or Lewis acid catalysts is from about 0.001 to about 10 weight percent, more specifically, from about 0.1 to about 2 weight percent, based on the initial weight of the mercapto-functional alkoxysilane.

The strong dehydrating agents include anhydrides of phosphoric acid, such as phosphorus pentaoxide, and chorosilanes such as silicon tetrachloride, methyltrichlorosilane. The strong dehydrating agents are used in less than, equal to or greater than stoichiometric amounts, more specifically from about 0.5 to about 1.5 equivalents of dehydrating agent relative to the carboxylic acid of formula (VII).

The reactions may be carried out at temperatures of from about 15° C. to about 200° C., more specifically from about 25° C. to about 100° C. and at sub-atmospheric, atmospheric or superatmospheric pressures, specifically from about 1.03 millibar to about 2 bar, more specifically from about 15 millibar to about 1.3 bar and even more specifically, from about 100 millibar to about 1.1 bar.

The reactions shown in Scheme C can also be carried out in the presence of solvents, such as for example aliphatic solvents or aromatic solvents.

The reactions can also be driving to completion by removing the water that is form. Dehydrating agents, distillation or stripping may be used to remove water. Organic solvents which form azeotropes with water, such as toluene, can aid in driving the reaction to completion.

In one embodiment, an alkoxysilyl-containing thiocarboxylic acid ester composition is provided comprising:
(i) an alkoxysilyl-containing thiocarboxylic acid esters of the general formula (I):

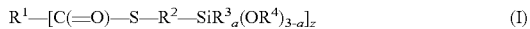

where $R^1$ is a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;
each $R^2$ is independently a divalent group selected from straight chain alkyl containing from 1 to 10 carbon atoms, a branched chain alkyl containing from 3 to 10 carbon atoms, a cycloalkyl containing from 5 to 10 carbon atoms,
an alkenyl containing from 2 to 10 carbon atoms, an aryl group containing from 6 to 10 carbon atoms or aralkyl containing from 7 to 10 carbon atoms;
each $R^3$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms or aralkyl containing from 7 to 10 carbon atoms;
$R^4$ is independently a monovalent group selected from straight chain alkyl containing from 1 to 6 carbon atoms, a branched chain alkyl containing from 3 to 6 carbon atoms, a cycloalkyl containing from 5 or 6 carbon atoms, an alkenyl containing from 2 to 6 carbon atoms, an aryl group containing 6 carbon atoms, aralkyl containing from 7 to 10 carbon atoms, a straight chain alkyl containing 2 to 6 carbon atoms and a hydroxyl group or a branched chain alkyl containing 3 to 6 carbon atoms and a hydroxyl group, an alkyl group containing at least one oxygen atom having the structure —$R^2$—$(OCH_2CH_2)_m(OCH_2CH(CH_3))_nOR^1$ or is a divalent group formed from two $R^4$ groups being bonded together through a covalent bond, with the provision that (i) if two $R^4$ groups are bonded together, then a is 0 or 1 and (ii) the sum of m+n is from 1 to 20;
a, m, n and z are integers wherein a is 0, 1 or 2, m is from 0 to 10, n is 0 to 10, and z is 1 or 2; and
(ii) a thioester of the general formula (II):

wherein
R$^1$ is a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;
each R$^5$ is independently a monovalent group selected from straight chain alkyl containing from 1 to 18 carbon atoms, a branched chain alkyl containing from 3 to 18 carbon atoms, a cycloalkyl containing from 5 to 18 carbon atoms, an alkenyl containing from 2 to 18 carbon atoms, an aryl group containing from 6 to 18 carbon atoms, aralkyl containing from 7 to 18 carbon atoms, and z is an integer wherein z is 1 or 2.

In another embodiment, the alkoxysilyl-containing thiocarboxylic acid ester Composition containing from about 70 to about 99.9 weight percent alkoxysilyl-containing thiocarboxylic acid ester (i) and from about 0.1 to about 30 weight percent thioester (ii), more specifically from about 85 to about 95.5 weight percent alkoxysilyl-containing thiocarboxylic acid ester (i) and from about 0.5 to about 15 percent thioester, where said weight percents are based on the total weight of the alkoxysilyl-containing thiocarboxylic acid ester (i) and thioester (ii).

In another embodiment, the alkoxysilyl-containing thiocarboxylic acid ester composition further comprising a mercapto-functional alkoxysilane. The amount of the mercapto-functional alkoxysilane is from about 0.1 to about 50 weight percent, based on the total weight of the alkoxysilyl-containing thiocarboxylic acid (i) and thioester (ii).

In still another embodiment, a rubber composition comprises an alkoxysilyl-containing thiocarboxylic acid ester (i) and a thioester (ii). The amount of the alkoxysilyl-containing thiocarboxylic acid ester in the rubber composition is from about 1 to about 14 weight percent, and the weight of the thioester is from about 0.001 to about 6 weight percent, said weight percents are based on the weight of the rubber component.

The rubber composition may further comprise a mercapto-functional alkoxysilane. The amount of the alkoxysilyl-containing thiocarboxylic acid ester (i) in the rubber composition is from about 1 to about 14 weight percent, the amount of thioester (ii) is from about 0.001 to about 6 weight percent and the amount of mercapto-functional alkoxysilane is from about 0.001 to about 10 weight percent, said weight percents are based on the weight of the rubber component.

EXAMPLES

The following examples are illustrative of the method of this invention.

All operations were performed under nitrogen atmosphere. Octanoic acid (>98%), cyclohexane thiol (97%), adipic acid (99%), trifluoromethanesulfonic acid (99%), phosphorus pentoxide (99%), sodium phosphate monobasic (99%), sodium carbonate decahydrate (99%), potassium tert-butoxide (98%), sodium (cubes, contains mineral oil, 99.9%) were all obtained from Sigma-Aldrich and used without further purification. Toluene and cyclohexane were obtained from Fisher Chemical. 3-Mercaptopropyltriethoxysilane was obtained from Momentive Performance Materials, Inc. Bis(triethoxysilylpropyl)disulfide (>90%) was obtained from Gelest.

Example 1

Synthesis of
3-(octanoylthio)-1-propyltriethoxysilane from a mixture of sodium 3-triethoxysilylpropylthiol and 3-mercaptopropyltriethoxysilane Into a 3-neck 2 L round bottom flask, octanoic acid (352.40 grams, 2.44 moles), cyclohexanethiol (284.01 grams, 2.44 moles) and trifluoromethanesulfonic acid (5.50 grams, 0.04 mole) were mixed together with 112.5 grams toluene solvent. The reaction mixture was stirred and water was removed using an azeotrope refluxing apparatus for 12 hours at 1 bar pressure. Water formed a low boiling azeotrope with the toluene. The reaction was cooled to room temperature. Unreacted octanoic acid was neutralized with 10% aqueous solution sodium carbonate until no more octanoic acid was detected by gas chromatography. The aqueous and organic layer were separated using a separation funnel. The unreacted cyclohexanethiol in the organic layer was removed under vacuum at a temperature of 100° C. and pressure of 5 mmHg for 1.5 hours. The amount of cyclohexanethiooctanoate produced was 426.0 grams, or a 72.0% yield.

Into a 3-neck 250 mL round bottom flask attached with a distillation head, the mixture of cyclohexanethiooctanoate (94.60 grams, 0.39 mole) and 3-mercaptopropyltriethoxysilane (95.02 grams, 0.40 mole) were treated with 2.24 grams (0.009 mole) of potassium tert-butoxide. The reaction mixture was under magnetic stirring at reduced pressure of 14-20 mm Hg together with nitrogen purging. The reaction mixture was heated at 80° C. for 1 hour, and then raised to 100° C. and heated for another hour, and finally raise to 120° C. heated for 4 more hours. Cyclohexanethiol byproduct was distilled over and collected while the reaction was running. When the reaction was comple, the mixture was cooled to room temperature. The reaction mixture was washed with 14.0 grams of 10% aqueous sodium phosphate monobasic and the organic layer was separated from the aqueous layer. The volatiles from the organic layer were removed under vacuum at a temperature of 90° C. and pressure of 15 mmHg for 90 minutes, resulting in 126 grams of 3-(octanoylthio)-1-propyltriethoxysilane, a 88.7% percent yield. The structure of the product was confirmed using GC/MS spectroscopy.

Example 2

Synthesis of
3-(octanoylthio)-1-propyltriethoxysilane from sodium 3-trimethoxysilylpropylthiolate At ambient temperature 4.78 grams (0.208 mole) of sodium was added to toluene and warmed to approximately 110° C., at atmospheric pressure. Into the molten sodium-toluene suspension, 45.51 grams (0.096 mole) of bis(triethoxysilylpropyl)disulfide was added over a period of 35 minutes. The reaction mixture was stirred at 105° C. for about an hour and cooled to about 40° C. Cyclohexanethiooctanoate (45.10 grams, 0.186 mole) was added to the reaction mixture over the course of 20 minutes resulting in a viscous salt suspension. The reaction was stirred for another 2 hours. The reaction mixture was treated with 72 grams of 12.5% brine solution resulting in the salts dissolving to give a clear yellow-orange toluene layer and a water layer. GC of the organic layer indicated 77% GC area percent of 3-(octanoylthio)-1-propyltriethoxysilane and 8% GC area percent of cyclohexanethiooctanoate in the mixture, where the area percents excluded the peak for toluene.

Example 3

Synthesis of bis-(3-triethoxysilyl-1-propyl) dithioadipate using a mixture of sodium triethoxysilylpropyl thiolate and 3-mercaptopropyltriethoxysilane In a 3-neck 1 L round bottom flask, adipic acid (94.53 grams, 0.65 mole), cyclohexanethiol (151.50 grams, 1.30 mole) and phosphorus pentoxide (22.75 grams, 0.16 mole) were mixed together with 165 grams of cyclohexane solvent. The reaction mixture was stirred and heated at a temperature of 80° C. and atmospheric pressure for 16 hours. During the course of reaction, more phosphorus pentoxide was added every 4 hours (22.75 grams, 0.16 mole each time, total amount 91.00 grams, 0.64 mole). Two layers were formed during the reaction with a colorless top organic layer and a black thick bottom layer. The reaction was cooled to about 65° C. and the top layer was decanted into another flask. White crystalline solids precipitated out as the temperature dropped to room temperature. The solid was washed with aqueous 10% sodium carbonate solution and recrystallized again using toluene/cyclohexane to give 177.01 grams of bis-cyclohexanethioadipate, a 80.1% yield.

Into a 3-neck 250 mL round bottom flask equipped with a distillation head, a mixture of bis-cyclohexanethioadipate (107.38 grams, 0.31 mole) and 3-mercaptopropyltriethoxysilane (142.15 grams, 0.60 mole) were charged, followed by the addition of 2.02 grams potassium tert-butoxide (0.018 mole). The reaction mixture was stirred using a magnetic stirrer at reduced pressure of 14-20 mm Hg under a nitrogen atmosphere. The reaction mixture was heated at a temperature of 80° C. for 1 hour, then heated at 100° C. for another hour, and finally heated at 120° C. for 6 more hours. Cyclohexanethiol byproduct is distilled during the heating of the reaction mixture and collected. When the reaction was completed, the mixture was cooled to room temperature, washed with 22.70 grams of 10% aqueous sodium phosphate monobasic solution to form two layers, and the organic layer was separated from the aqueous layer. The volatiles from the organic layer are removed under vacuum at a temperature of 90° C. and pressure of 15 mm Hg for 90 min to produce 150.0 grams of bis-(3-triethoxysilyl-1-propyl) dithioadipate, a yield of 81.5%.

Example 4

Synthesis of 3-(octanoylthio)-1-propyltriethoxysilane from a mixture of sodium 3-triethoxysilylpropylthiol and 3-mercaptopropyltriethoxysilane Into a 4-neck 2000 mL round bottom flask, octanoic acid (372.2 grams, 2.58 moles) and hexanethiol (534 grams, 4.51 mole) and 197 grams if cyclohexane solvent were charged. The reaction mixture was magnetically stirred and heated to a pot temperature between 126-132° C. at atmospheric pressure. Trifluoromethanesulfonic acid (2.9 grams, 0.02 mole) was added at the refluxing temperature. The reaction mixture was refluxed under azeotropic distillation conditions for about 10 hours, and the cooled to room temperature. After 7 hours, GC analysis showed 8.2 area % of unreacted octanoic acid, and after 10 hours, GC analysis showed 2.6 area % of unreacted octanoic acid in the reaction mixture. Water (42.6 grams) and 64.7 grams of cyclohexane were collected in the Dean-Stark collector. The reddish color mixture was treated with 273.7 grams of 10% aqueous sodium carbonate solution to remove the octanoic acid and the two phases were separated. The organic layer was stripped at a temperature of 50° C. and pressure of 5 mmHg for 2 hour and then at 85° C. and 5 mm Hg pressure for about 6 hours. A total of 338 grams of liquid were collected in the cold trap. Hexyl thiooctanoic acid ester intermediate, a clear and slightly yellow liquid (609.9 grams), was collected, giving a 96.8% yield based on the octanoic acid).

Into a 500-mL round bottom reaction flask equipped with a nitrogen bubbler, vacuum and a short distillation head, were charged mercaptopropyltriethoxysilane (163.72 grams, 0.687 mole) and 2.0 mole percent solution of sodium ethoxide in ethanol (4.5 grams). The mixture was placed under a value at room temperature to remove all the ethanol. The hexyl thiooctanoic acid ester (163.28 grams, 0.669 mole) was added to the reaction and the flask was placed under a vacuum of 140 mm Hg pressure and heated to a temperature of 80° C. The reaction apparatus was set up for distillation to collect a distillated of hexanethiol. The reaction mixture was then heat at a temperature of 80° C. and a pressure of 140 mmHg for 20 minutes, at a pressure of 120 mm Hg for 20 minutes and at a pressure of 30 mm Hg for 20 minutes. The reaction temperature was raised to 100° C. at a pressure of 120 mmHg for 20 minutes, at a pressure of 50 mm Hg for 20 minutes and at a pressure of 30 mm Hg for 20 minutes. The reaction mixture was further heated at a temperature of 120° C. at a pressure of 50 mmHg for 20 minutes, at a pressure of 40 mm Hg for 20 minutes and at a pressure of 30 mm Hg for 20 minutes. Hexanethiol (68.8 grams) was collected and the reaction was about 80% complete. The reaction mixture was heated for another 5 hours at a temperature of 120° C. and pressure of 30 mm Hg, collecting another 13.1 grams of distillate. The reaction mixture was then cooled to room temperature and placed under an atmosphere of nitrogen. An aqueous solution of 10% sodium phosphate monobasic (12.6 grams) was added to neutralize the base catalyst. The neutralized mixture was then stripped to remove the trace water and residual hexanethiol at a temperature of 55° C. and pressure of 30 mm Hg for 1 hour and at a temperature of 100° C. and pressure of 30 mm Hg for 3 hours. The stripped mixture was filter using a 1-micron media to provide for 228.5 grams, 93.8% yield of 3-triethoxysilylpropylthiooctanoate as a clear liquid. GC analysis of the liquid indicated that the purity of the product was 91%.

Example 5

Synthesis of hexyl thiooctanoic acid ester using tetrachlorosilane water scavenger Octanoic acid (213.7 grams, 1.48 mole), hexanethiol (175.2 grams, 1.48 mole), tetrachlorosilane (150.8 grams, 0.89 mole) and triflic acid (0.44 grams) were charged to the reaction flask under a nitrogen blank. The reaction mixture was stirred and heated between 90 and 105° C. for about 4 hours. The mixture was cooled to room temperature. An aqueous 10% sodium carbonate solution was added to neutralize unreacted octanoic acid and triflic acid catalyst. After standing for about 30 minutes, solids settled at the bottom of reaction flask. The organic phase and aqueous phase liquids was decanted into a separatory funnel, and were separated. The organic phase layer, which contained the product, was vacuum stripped to remove any unreacted hexanethiol and small amount of water. The hexyl thiooctanoic acid ester (305.5 grams) was collected, a yield of 84.6%.

Example 6

Synthesis of 3-triethoxysilylpropyl thiooctanoate using a tube reactor

The reactor was a vertical column packed with glass beads. On the top of the column was a joint containing an addition funnel and a short-path column equipped with a distillation head and a top receiving flask. At the bottom of the column was a bottom receiving flask. A mixture of 3-mercaptopropyltriethoxysilane, sodium 3-triethoxysilylpropyl thiolate and hexyl thiooctanoic acid ester was added to the addition funnel. The mixture was prepared by mixing 3-mercaptopropyltriethoxysilane (118.2 grams, 0.496 mole) and sodium ethoxide in ethanol (3.0 grams, 0.009 mole). The ethanol was removed under vacuum. Hexyl thiooctanoic acid ester (118.1 grams, 0.484 mole) was added.

The packed column was heated and maintain at a temperature range of 110° C. to 125° C. under about 70 mm Hg of pressure. The mixture in the addition funnel was slowly added to the heated packed column and allowed to pass through the heated packed column and the liquid was collected in the bottom receiving flask. Any low boiling components passed up the short column and was collected in a top receiving flask. After all of the mixture in the addition funnel was added to the packed column, the reaction mixture in the bottom receiving flask was transferred to the addition funnel, and the addition process was repeated. After the two passes were complete, 40.0 grams of a low boiling liquid was collected in the top receiving flask. The low boiling liquid was analyzed by gas chromatography. The analysis showed that the low boiling liquid was 95% hexanethiol. Gas chromatographic analysis of the liquid in the bottom flask found the liquid was a mixture of 64.5% 3-triethoxysilylpropyl thiooctanoate, 12% 3-mercaptopropyltriethoxysilane and 14% hexyl thiooctanoic acid ester. The contents in the bottom receiving flask was transferred to the addition funnel and passed through the heated packed column three more times. After five passes through the heated packed column, the liquid in the bottom receiving flask was analyzed. The liquid was a mixture of 75.1% 3-triethoxysilylpropyl thiooctanoate, 6.8% 3-mercaptopropyltriethoxysilane and 8.9% hexyl thiooctanoic acid ester.

The process of Example 6 could be converted into a continuous process by continuously adding fresh reagents to the addition funnel and removing a portion of the reaction mixture from the bottom receiving flask.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for the manufacture of an alkoxysilyl-containing thiocarboxylic acid ester of the general formula (I):

$$R^1-[C(=O)-S-R^2-SiR^3_a(OR^4)_{3-a}]_z \qquad (I)$$

wherein $R^1$ is a monovalent group selected from straight chain alkyl group containing from 1 to 18 carbon atoms, a branched chain alkyl group containing from 3 to 18 carbon atoms, a cycloalkyl group containing from 5 to 18 carbon atoms, an alkenyl group containing from 2 to 18 carbon atoms, an aryl group containing from 6 to 18 carbon atoms, aralkyl group containing from 7 to 18 carbon atoms or hydrogen, or is a divalent group selected from an alkyl group containing from 1 to 10 carbon atoms, a cycloalkyl group containing from 5 to 10 carbon atoms or phenyl group;

each $R^2$ is independently a divalent group selected from straight chain alkyl group containing from 1 to 10 carbon atoms, a branched chain alkyl group containing from 3 to 10 carbon atoms, a cycloalkyl group containing from 5 to 10 carbon atoms, an alkenyl group containing from 2 to 10 carbon atoms, an aryl group containing from 6 to 10 carbon atoms or aralkyl group containing from 7 to 10 carbon atoms;

each $R^3$ is independently a monovalent group selected from straight chain alkyl group containing from 1 to 6 carbon atoms, a branched chain alkyl group containing from 3 to 6 carbon atoms, a cycloalkyl group containing from 5 or 6 carbon atoms, an alkenyl group containing from 2 to 6 carbon atoms, an aryl group containing 6 carbon atoms or an aralkyl group containing from 7 to 10 carbon atoms;

$R^4$ is independently a monovalent group selected from straight chain alkyl group containing from 1 to 6 carbon atoms, a branched chain alkyl group containing from 3 to 6 carbon atoms, a cycloalkyl group containing from 5 or 6 carbon atoms, an alkenyl group containing from 2 to 6 carbon atoms, an aryl group containing 6 carbon atoms, aralkyl group containing from 7 to 10 carbon atoms, a straight chain alkyl group containing 2 to 6 carbon atoms and a hydroxyl group, an alkyl group containing at least one oxygen atom having the structure $-R^2-(OCH_2CH_2)_m(OCH_2CH(CH_3))_nOR^1$ or a divalent group formed from two $R^4$ groups being bonded together through a covalent bond, with the provision that (i) if two $R^4$ groups are bonded together, then a is 0 or 1 and (ii) the sum of m+n is from 1 to 20; and a, m, n and z are integers wherein a is 0, 1 or 2, m is from 0 to 10, n is from 0 to 10 and z is 1 or 2, and wherein the method comprises:

reacting a thioester of the general formula (II):

$$R^1[C(=O)SR^5]_z \qquad (II)$$

wherein each $R^5$ is independently a monovalent group selected from straight chain alkyl group containing from 1 to 18 carbon atoms, a branched chain alkyl group containing from 3 to 18 carbon atoms, a cycloalkyl group containing from 5 to 18 carbon atoms, an alkenyl group containing from 2 to 18 carbon atoms, an aryl group containing from 6 to 18 carbon atoms, aralkyl group containing from 7 to 18 carbon atoms, and wherein $R^1$ and z are as defined above, with a mercapto-functional alkoxysilane of general formula (V):

$$HS-R^2-SiR^3{}_a(OR^4)_{3-a} \quad (V)$$

wherein $R^2$, $R^3$ and $R^4$ and a are as defined above, and/or an alkali metal salt, an alkaline earth metal salt or a trisubstituted ammonium salt of an alkoxysilyl-functional thiolate of the general formula (III):

$$M^+{}^-S-R^2-SiR^3{}_a(OR^4)_{3-a} \quad (III)$$

wherein $M^+$ is an alkali metal ion, an alkaline earth metal ion or a trisubstituted ammonium ion, and $R^2$, $R^3$, $R^4$ and a are as defined above.

2. The method of claim 1 further comprising (a) contacting the thioester of general formula of (II) with the mercapto-functional alkoxysilane of general formula (V) and/or the alkali metal salt, the alkaline earth metal salt or the trisubstituted ammonium salt of the alkoxysilyl-functional thiolate of general formula (III) prior to the reacting step;

(b) reacting the thioester of general formula (II) with the mercapto-functional alkoxysilane of general formula (V) and/or the alkali metal salt, the alkaline earth metal salt or the trisubstituted ammonium salt of the alkoxysilyl-functional thiolate of general formula (III) of step (a) to further produce a byproduct which is a thiol of general formula (VI):

$$HSR^5 \quad (VI)$$

wherein $R^5$ is as defined above and/or a byproduct which is an alkali metal salt, an alkaline earth metal salt or a trisubstituted ammonium salt of a thiolate of general formula (IV):

$$M^+{}^-SR^5 \quad (IV)$$

wherein $M^+$ and $R^5$ are as defined above which form a mixture comprising the alkoxysilyl-containing thiocarboxylic acid ester of general formula (I), and the byproduct which is the thiol of general formula (VI) and/or the byproduct which is the alkali metal salt, the alkaline earth salt or the trisubstituted ammonium salt of the thiolate of general formula (IV);

(c) removing the byproduct which is the thiol of general formula (VI) and/or the byproduct which is the alkali metal salt, the alkaline earth metal salt or the trisubstituted ammonium salt of the thiolate of general formula (IV) from the mixture formed in step (b) to produce a product mixture containing the alkoxysilyl-containing thiocarboxylic acid ester of general formula (I);

(d) optionally, further treating the product mixture formed in step (c); and (e) optionally, reacting the byproduct which is the thiol of general formula (VI) and/or the byproduct which is the alkali metal salt, the alkaline earth metal salt or the trisubstituted ammonium salt of the thiolate of general formula (IV) removed from of step (c) with a carboxylic acid to form the thioester of general formula (II), and adding the thioester of general formula (II) to step (a) to prepare the alkoxysilyl-containing thiocarboxylic acid ester of the general formula (I).

3. The method of claim 2 wherein $R^1$ is a monovalent straight chain alkyl group containing 5 to 11 carbon atoms, a monovalent branched chain alkyl group containing 5 to 11 carbon atoms or a divalent straight chain alkyl group of from 1 to 8 carbon atoms, $R^2$ is a divalent alkyl group containing 1 to 6 carbon atoms or a branched chain alkyl group containing 3 to 6 carbon atoms, $R^3$ is methyl, $R^4$ is monovalent ethyl, 2-hydroxylethyl, 2-hydroxylpropyl, 3-hydroxyl-2-methylpropyl, 2-hydroxylbutyl, 3-hydroxylbutyl or 3-hydroxyl-1,3-dimethylbutyl or where two $R^4$ are bonded together to form a divalent group $R^4$—$R^4$— having the structure —$CH_2CH_2CH_2$—, —$CH_2CH(CH_3)CH_2$— or —$CH_2CH_2CH(CH_3)$—, $R^5$ is a monovalent straight chain alkyl group of from 4 to 8 carbon atoms, a monovalent branched chain alkyl group of from 4 to 8 carbon atoms or a monovalent cycloalkyl group of from 5 to 8 carbon atoms, $M^+$ is sodium ion, a is 0 or 1 and z is 1 or 2.

4. The method of claim 2 wherein the alkoxysilyl-containing thiocarboxylic acid ester of general formula (I) is selected from the group consisting of 2-triethoxysilyl-1-ethyl thioacetate; 2-trimethoxysilyl-1-ethyl thioacetate; 2-(methyldimethoxysilyl)-1-ethyl thioacetate; 3-trimethoxysilyl-1-propyl thioacetate; triethoxysilylmethyl thioacetate; trimethoxysilylmethyl thioacetate; triisopropoxysilylmethyl thioacetate; methyldiethoxysilylmethyl thioacetate; methyldimethoxysilylmethyl thioacetate; methyldiisopropoxysilylmethyl thioacetate; dimethylethoxysilylmethyl thioacetate; dimethylmethoxysilylmethyl thioacetate; dimethylisopropoxysilylmethyl thioacetate; 2-triisopropoxysilyl-1-ethyl thioacetate; 2-(methyldiethoxysilyl)-1-ethyl thioacetate; 2-(methyldiisopropoxysilyl)-1-ethyl thioacetate; 2-(dimethylethoxysilyl)-1-ethyl thioacetate; 2-(dimethylmethoxysilyl)-1-ethyl thioacetate; 2-(dimethylisopropoxysilyl)-1-ethyl thioacetate; 3-triethoxysilyl-1-propyl thioacetate; 3-triisopropoxysilyl-1-propyl thioacetate; 3-methyldiethoxysilyl-1-propyl thioacetate; 3-methyldimethoxysilyl-1-propyl thioacetate; 3-methyldiisopropoxysilyl-1-propyl thioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxysilyl-1-ethyl)-4-thioacetylnorbornene; 6-triethoxysilyl-1-hexyl thioacetate; 1-triethoxysilyl-5-hexyl thioacetate; 8-triethoxysilyl-1-octyl thioacetate; 1-triethoxysilyl-7-octyl thioacetate; 6-triethoxysilyl-1-hexyl thioacetate; 1-triethoxysilyl-5-octyl thioacetate; 8-trimethoxysilyl-1-octyl thioacetate; 1-trimethoxysilyl-7-octyl thioacetate; 10-triethoxysilyl-1-decyl thioacetate; 1-triethoxysilyl-9-decyl thioacetate; 1-triethoxysilyl-2-butyl thioacetate; 1-triethoxysilyl-3-butyl thioacetate; 1-triethoxysilyl-3-methyl-2-butyl thioacetate; 1-triethoxysilyl-3-methyl-3-butyl thioacetate; 3-trimethoxysilyl-1-propyl thiooctanoate; 3-triethoxysilyl-1-propyl thiopalmitate; 3-triethoxysilyl-1-propyl thiooctanoate; 3-triethoxysilyl-1-propyl thiobenzoate; 3-triethoxysilyl-1-propyl thio-2-ethylhexanoate; 3-methyldiacetoxysilyl-1-propyl thioacetate; 3-triacetoxysilyl-1-propyl thioacetate; 2-methyldiacetoxysilyl-1-ethyl thioacetate; 2-triacetoxysilyl-1-ethyl thioacetate; 1-methyldiacetoxysilyl-1-ethyl thioacetate; 1-triacetoxysilyl-1-ethyl thioacetate; bis-(3-triethoxysilyl-1-propyl) dithiophthalate; bis-(3-triethoxysilyl-1-propyl) dithio-iso-phthalate; bis-(3-triethoxysilyl-1-propyl) dithiotere-phthalate; bis-(3-triethoxysilyl-1-propyl) dithiosuccinate, bis-(3-triethoxysilyl-1-propyl) dithiooxalate; bis-(3-triethoxysilyl-1-propyl) dithiosebacate, bis-(3-triethoxysilyl-1-propyl) dithioadipate; thioacetic acid S-(2-methyl-[1,3,2]dioxasilinan-2-ylmethyl) ester; thioacetic acid S-(2-ethoxy-[1,3,2]dioxasilinan-2-ylmethyl) ester; thioacetic acid S-(2,5-dimethyl-[1,3,2]dioxasilinan-2-ylmethyl) ester; thioacetic acid S-(2-ethoxy-5-methyl-[1,3,2]dioxasilinan-2-ylmethyl) ester, thioacetic acid S-[2-(3-hydroxypropoxy)-[1,3,2]dioxasilinan-2-ylmethyl] ester; thioacetic acid S-[2-(3-hydroxy-2-methylpropoxy)-5-methyl-[1,3,2]dioxasilinan-2-ylmethyl] ester; thioacetic acid S-[2-(3-hydroxy-2-methylpropoxy)-5-methyl-[1,3,2]dioxasilinan-2-ylmethyl] ester; thioacetic acid S-[2-(3-hydroxy-3-methylpropoxy)-4-methyl-[1,3,2]dioxasilinan-2-ylmethyl] ester; thioacetic acid S-(2-methyl-[1,3,2]dioxasilinan-2-ylpropyl) ester; thioacetic acid S-(2-ethoxy-[1,3,2]dioxasilinan-2-ylpropyl) ester; thioacetic acid S-(2,5-dimethyl-[1,3,2]dioxasilinan-2-ylpropyl) ester; thioacetic acid S-(2-ethoxy-5-methyl-[1,3,2]dioxasilinan-2-ylpropyl) ester, thioacetic acid S-[2-(3-hydroxypropoxy)-[1,3,2]dioxasilinan-2-ylpropyl] ester; thioacetic acid S-[2-(3-hydroxy-2-methylpropoxy)-5-methyl-[1,3,2]dioxasilinan-2-ylpropyl] ester; thioacetic acid S-[2-(3-hydroxy-2-methylpropoxy)-5-methyl-[1,3,2]dioxasilinan-2-ylpropyl] ester; thioacetic acid S-[2-(3-hydroxy-3-methylpropoxy)-4-methyl-[1,3,2]dioxasilinan-2-ylpropyl] ester; thiopropionic acid S-[2-(3-hydroxy-2-methylpropoxy)-5-methyl-[1,3,2]dioxasilinan-2-ylpropyl] ester; thiopentanoic acid S-[2-(3-hydroxy-2-methylpropoxy)-5-methyl-[1,3,2]dioxasilinan-2-ylpropyl] ester; thiohexanoic acid S-[2-(3-hydroxy-2-methylpropoxy)-5-methyl-[1,3,2]dioxasilinan-2-ylpropyl] ester; 2-ethyl-thiohexanoic acid S-[2-(3-hydroxy-2-methylpropoxy)-5-methyl-[1,3,2]dioxasilinan-2-ylpropyl] ester; thiooctanoic acid S-(2-methyl-[1,3,2]dioxasilinan-2-ylpropyl) ester; thiooctanoic acid S-(2-ethoxy-[1,3,2]dioxasilinan-2-ylpropyl) ester; thiooctanoic acid S-(2,5-dimethyl-[1,3,2]dioxasilinan-2-ylpropyl) ester; thiooctanoic acid S-(2-ethoxy-5-methyl-[1,3,2]dioxasilinan-2-ylpropyl) ester, thiooctanoic acid S-[2-(3-hydroxypropoxy)-[1,3,2]dioxasilinan-2-ylpropyl] ester; thiooctanoic acid S-[2-(3-hydroxy-2-methylpropoxy)-5-methyl-[1,3,2]dioxasilinan-2-ylpropyl] ester; thiooctanoic acid S-[2-(3-hydroxy-2-methylpropoxy)-5-methyl-[1,3,2]dioxasilinan-2-ylpropyl] ester; thiooctanoic acid S-[2-(3-hydroxy-3-methylpropoxy)-4-methyl-[1,3,2]dioxasilinan-2-ylpropyl] ester; thioacetic acid S-(2,4-dimethyl-[1,3,2]dioxasilolan-2-ylmethyl) ester; thioacetic acid S-(2,4-dimethyl-[1,3,2]dioxasilolan-2-ylpropyl) ester; thiooctanoic acid S-(2,4-dimethyl-[1,3,2]dioxasilolan-2-ylpropyl) ester and combinations thereof.

5. The method of claim 2 wherein the thioester of the general formula (II) is selected from the selected from the group consisting of methylthioacetate, ethylthioacetate, allylthioacetate, propylthioacetate, butylthioacetate, pentathioacetate, hexylthioacetate, cyclohexylthioacetate, phenylthioacetate, benzylthioacetate, methylthiooctanoate, ethylthiooctanoate, allylthiooctanoate, propylthiooctanoate, butylthiooctanoate, pentathiooctanoate, hexylthiooctanoate, cyclohexylthiooctanoate, phenylthiooctanoate, benzylthiooctanoate, hexylthioadipate, cyclohexylthioadipate, phenylthioadipate, benzylthioadipate, and combinations thereof.

6. The method of claim 2 wherein the alkali metal salt, the alkaline earth metal salt or the trisubstituted ammonium salt of the alkoxysilyl-functional thiolate of general formula (III) is selected from the group consisting of sodium 3-trimethoxysilylpropanethiolate, sodium 3-triethoxysilylpropanethiolate, sodium 3-diethoxymethylsilylpropanethiolate, sodium trimethoxysilylmethanethiolate, sodium 3-[2-(3-hydroxy-3-methylpropoxy)-4-methyl-[1,3,2]dioxasilinan-2-yl]propanethiolate, sodium 3-[2-(3-hydroxy-2-methylpropoxy)-5-methyl-[1,3,2]dioxasilinan-2-yl]propanethiolate, sodium 3-[2-ethoxy-5-methyl-[1,3,2]dioxasilinan-2-yl]propanethiolate, sodium 3-(2,4-dimethyl-[1,3,2]dioxasilolan-2-yl)propanethiolate, potassium 3-trimethoxysilylpropanethiolate, potassium 3-triethoxysilylpropanethiolate, potassium 3-diethoxymethylsilylpropanethiolate, potassium trimethoxysilylmethanethiolate, potassium 3-[2-(3-hydroxy-3-methylpropoxy)-4-methyl-[1,3,2]dioxasilinan-2-yl]propanethiolate, potassium 3-[2-(3-hydroxy-2-methylpropoxy)-5-methyl-[1,3,2]dioxasilinan-2-yl]propanethiolate, potassium 3-[2-ethoxy-5-methyl-[1,3,2]dioxasilinan-2-yl]propanethiolate, sodium 3-(2,4-dimethyl-[1,3,2]dioxasilolan-2-yl)propanethiolate, trimethylammonium 3-trimethoxysilylpropanethiolate, triethylammonium 3-triethoxysilylpropanethiolate, tri-isopropylammonium 3-diethoxymethylsilylpropanethiolate, trimethylammonium trimethoxysilylmethanethiolate, triethylammonium 3-[2-(3-hydroxy-3-methylpropoxy)-4-methyl-[1,3,2]dioxasilinan-2-yl]propanethiolate, tri-isopropylammonium 3-[2-(3-hydroxy-2-methylpropoxy)-5-methyl-[1,3,2]dioxasilinan-2-yl]propanethiolate, tri-isopropylammonium 3-[2-ethoxy-5-methyl-[1,3,2]dioxasilinan-2-yl]propanethiolate, trimethylammonium 3-(2,4-dimethyl-[1,3,2]dioxasilolan-2-yl)propanethiolate and combinations thereof.

7. The method of claim 2 wherein the mercapto-functional alkoxysilane of general formula (V) is selected from the group consisting of mercapto-functional alkoxysilane can be selected from the group consisting of (3-mercaptopropyl)trimethoxysilane, (3-mercaptopropyl)triethoxysilane, (3-mercaptopropyl)dimethoxymethylsilane, (3-mercaptopropyl)diethoxymethylsilane, (3-mercaptopropyl)dimethyl(methoxy)silane, (3-mercaptopropyl)dimethyl(ethoxy)silane, (2-mercaptoethyl)trimethoxysilane, (2-mercaptoethyl)triethoxysilane, (2-mercaptoethyl)dimethoxymethylsilane, (2-mercaptoethyl)diethoxymethylsilane, (2-mercaptoethyl)dimethyl(methoxy)silane, (2-mercaptoethyl)dimethyl(ethoxy)silane, 2-methyl-[1,3,2]dioxasilinan-2-ylmethyl mercaptan, 2-ethoxy-[1,3,2]dioxasilinan-2-ylmethyl mercaptan, 2,5-dimethyl-[1,3,2]dioxasilinan-2-ylmethyl mercaptan, 2-ethoxy-5-methyl-[1,3,2]dioxasilinan-2-ylmethyl mercaptan, 2-(3-hydroxypropoxy)-[1,3,2]dioxasilinan-2-ylmethyl mercaptan, 2-(3-hydroxy-2-methylpropoxy)-5-methyl-[1,3,2]dioxasilinan-2-ylmethyl mercaptan, 2-(3-hydroxy-2-methylpropoxy)-5-methyl-[1,3,2]dioxasilinan-2-ylmethyl mercaptan, 2-(3-hydroxy-3-methylpropoxy)-4-methyl-[1,3,2]dioxasilinan-2-ylmethyl mercaptan, 2-methyl-[1,3,2]dioxasilinan-2-ylpropyl mercaptan, 2-ethoxy-[1,3,2]dioxasilinan-2-ylpropyl mercaptan, 2,5-dimethyl-[1,3,2]dioxasilinan-2-ylpropyl mercaptan, 2-ethoxy-5-methyl-[1,3,2]dioxasilinan-2-ylpropyl mercaptan, 2-(3-hydroxypropoxy)-[1,3,2]dioxasilinan-2-ylpropyl mercaptan, 2-(3-hydroxy-2-methylpropoxy)-5-methyl-[1,3,2]dioxasilinan-2-ylpropyl mercaptan, 2-(3-hydroxy-2-methylpropoxy)-5-methyl-[1,3,2]dioxasilinan-2-ylpropyl mercaptan, 2-(3-hydroxy-3-methylpropoxy)-4-methyl-[1,3,2]dioxasilinan-2-ylpropyl mercaptan and combinations thereof.

8. The process of claim 2 wherein the byproduct which is the thiol of general formula (VI) has a boiling point that is lower than the boiling point of the mercapto-functional alkoxysilane of general formula (V) and/or the thioester of general formula (II) by less than about 5° C. at an atmospheric pressure of about 1.013 bar.

9. The method of claim 2 further comprising an organic solvent.

10. The method of claim 8 wherein the reaction of the thioester of general formula (II) with the mercapto-functional alkoxysilane of general formula (V) produces the byproduct which is the thiol of general formula (VI).

11. The method of claim 10, further comprising carrying out the reaction in the presence of a catalyst selected from a Brønsted-Lowry acid or a Lewis acid.

12. The method of claim 10 wherein the byproduct which is the thiol of general formula (VI) is removed by distillation or stripping.

13. The method of claim 10 wherein the mercapto-functional alkoxysilane of general formula (V) is in the amount of from about 0.5 to about 1.5 equivalents based upon the thioester of general formula (II).

14. The method of claim 2 wherein the reaction of the thioester of general formula (II) with the alkali metal salt, the alkaline earth metal salt or the trisubstituted ammonium salt of the alkoxysilyl-functional thiolate of formula (III) produces the byproduct which is the alkali metal salt, the alkaline earth metal salt or the trisubstituted ammonium salt of the thiolate of general formula (IV).

15. The method of claim 14 wherein the reaction of the thioester of general formula (II) with the alkali metal salt, the alkaline earth metal salt or the trisubstituted ammonium salt of the alkoxysilyl-functional thiolate of general formula (III) is carried out at temperatures of from about 15° C. to about 200° C. and at pressures of from about 0.001 bar to about 2 bar.

16. The method of claim 14 wherein the alkali metal salt, the alkaline earth metal salt or the trisubstituted ammonium salt of the alkoxysilyl-functional thiolate of general formula (III) is in the amount of from about 0.5 to about 1.5 equivalents based upon the thioester of general formula (II).

17. The method of claim 2 wherein the step (b) further comprises:
(b1) reacting the byproduct which is the alkali metal salt, the alkaline earth metal salt, or the trisubstituted ammonium salt of the thiolate of formula (IV) with the mercapto-functional alkoxysilane of formula (V) to form the alkali metal salt, the alkaline earth metal salt, or the trisubstituted ammonium salt of the alkoxysilyl-functional thiolate of formula (III) and the byproduct which is the thiol of general formula (VI).

18. The method of claim 17, wherein the alkoxysilyl-functional thiolate of general formula (V) is used in the amount of from about 0.001 to about 0.9 equivalents based upon the thioester of general formula (II), and the alkali metal salt, the alkaline earth metal salt or the trisubstituted ammonium salt of the alkoxysilyl-functional thiolate of general formula (III) is used in the molar ratio of from about 0.00065 to about 1.5 relative to the mercapto-functional alkoxysilane of general formula (V).

19. The method of claim 17, wherein the thioester of general formula (II) is reacted with the alkali metal salt, the alkaline earth metal salt or the trisubstituted ammonium salt of the alkoxysilyl-functional thiolate of general formula (III) at temperatures of from about 15° C. to about 200° C. and at pressures of from about 0.001 bar to about 2 bar.

20. The method of claim 17 wherein said method is carried out in a batch process, semi-continuous process or a continuous process.

21. The method of claim 20, where said continuous process comprises:
(a) continuously contacting the thioester of general formula (H) with the mercapto-functional alkoxysilane of general formula (V) and the alkali metal salt, the alkaline earth metal salt, or the trisubstituted ammonium salt of the alkoxysilyl-functional thiolate of general formula (III) by continuously adding the thioester of general formula (II), the mercapto-functional alkoxysilane of general formula (V) and the alkali metal salt, the alkaline earth metal salt or the trisubstituted ammonium salt of an alkoxysilyl-functional thiolate of general formula (III) into a first reaction vessel;

(b) continuously reacting the thioester of general formula (H) with the alkali metal salt, the alkaline earth metal salt or the trisubstituted ammonium salt of the alkoxysilyl-functional thiolate of general formula (III) of step (a) in the first reaction vessel to produce the alkoxysilyl-containing thiocarboxylic acid ester of general formula (I) and the byproduct alkali metal salt, alkaline earth metal salt or trisubstituted ammonium salt of the thiolate of general formula (IV);

(b1) continuously reacting the alkali metal salt, the alkaline earth metal salt or the trisubstituted ammonium salt of thiolate of general formula (IV) formed in step (b) with the mercapto-functional alkoxysilane of general formula (V) to form the alkali metal salt, the alkaline earth metal salt, or the trisubstituted ammonium salt of the alkoxysilyl-functional thiolate of general formula (III) and the byproduct thiol of the general formula (VI) in the first reaction vessel, wherein the reactions of step (b) and (b1) form a reaction mixture containing the alkoxysilyl-containing the thiocarboxylic acid ester of general formula (I), the thioester of general formula (II), the alkali metal salt, the alkaline earth metal salt, or the trisubstituted ammonium salt of the alkoxysilyl-functional thiolate of general formula (III) and the mercapto-functional alkoxysilane of general formula (V), and the alkali metal salt, the alkaline earth metal salt, and/or the trisubstituted ammonium salt of thiolate of general formula (III) and the byproduct thiol of general formula (VI);

(c) continuously removing the reaction mixture of step (b1) from the first reaction vessel and transferring the reaction mixture to a distillation apparatus;

(c1) continuously separating the byproduct thiol of general formula (VI) from the other components in the reaction mixture of step (b1) by passing the reaction mixture through distillation apparatus, forming a separated byproduct thiol of general formula (VI) and a mixture of other components;

(c2) continuously removing a portion of the other component of step (c1)

(c3) continuously recycling the remaining portion of other component of step (c1) to the first reaction vessel;

(d) continuous transferring the mixture of other component of step (c2) to a second reactor for further treatment to form the alkoxysilyl-containing thiocarboxylic acid ester of general formula (I);

(d1) continuous transferring the alkoxysilyl-containing thiocarboxylic acid ester of general formula (I) of step (d) to a storage vessel;

(e) optionally, using the separated byproduct thiol of general formula (VI) of step (c1) with a carboxylic acid to prepare the thioester of general formula (II), and transferring the thioester of general formula (II) to the first reaction vessel of step (a) to step (a) to prepare the alkoxysilyl-containing thiocarboxylic acid ester of the general formula (I).

22. The method of claim 2, wherein the thioester of general formula (II) is prepared by reaction of a carboxylic acid of general formula (VII):

wherein $R^1$ and z are as defined herein, in the presence of at least one compound selected from the group consisting of an acid catalyst, a dehydrating agent and moisture scavenger.

23. An alkoxysilyl-containing thiocarboxylic acid ester composition comprising:

(i) an alkoxysilyl-containing thiocarboxylic acid ester of the general formula (I):

$$R^1\text{—}[C(=O)\text{—}S\text{—}R^2\text{—}SiR^3_a(OR^4)_{3-a}]_z \quad (I)$$

where $R^1$ is a monovalent group selected from straight chain alkyl group containing from 1 to 18 carbon atoms, a branched chain alkyl group containing from 3 to 18 carbon atoms, a cycloalkyl containing from 5 to 18 carbon atoms, an alkenyl containing from 2 to 18 carbon atoms, an aryl containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;

each $R^2$ is independently a divalent group selected from straight chain alkyl group containing from 1 to 10 carbon atoms, a branched chain alkyl group containing from 3 to 10 carbon atoms, a cycloalkyl group containing from 5 to 10 carbon atoms, an alkenyl group containing from 2 to 10 carbon atoms, an aryl group containing from 6 to 10 carbon atoms or aralkyl group containing from 7 to 10 carbon atoms;

each $R^3$ is independently a monovalent group selected from straight chain alkyl group containing from 1 to 6 carbon atoms, a branched chain alkyl group containing from 3 to 6 carbon atoms, a cycloalkyl group containing from 5 or 6 carbon atoms, an alkenyl group containing from 2 to 6 carbon atoms, an aryl group containing 6 carbon atoms or an aralkyl group containing from 7 to 10 carbon atoms;

$R^4$ is independently a monovalent group selected from straight chain alkyl group containing from 1 to 6 carbon atoms, a branched chain alkyl group containing from 3 to 6 carbon atoms, a cycloalkyl group containing from 5 or 6 carbon atoms, an alkenyl group containing from 2 to 6 carbon atoms, an aryl group containing 6 carbon atoms, aralkyl group containing from 7 to 10 carbon atoms, a straight chain alkyl group containing 2 to 6 carbon atoms and a hydroxyl group, an alkyl group containing at least one oxygen atom having the structure —$R^2$—(OCH$_2$CH$_2$)$_m$(OCH$_2$CH(CH$_3$))$_n$OR$^1$ or a divalent group formed from two $R^4$ groups being bonded together through a covalent bond, with the provision that (i) if two $R^4$ groups are bonded together, then a is 0 or 1 and (ii) the sum of m+n is from 1 to 20;

a, m, n and z are integers wherein a is 0, 1 or 2, m is from 0 to 10, n is from 0 to 10 and z is 1 or 2, and (ii) a thioester of the general formula (II):

$$R^1[C(=O)SR^5]_z \quad (II)$$

wherein $R^1$ is a monovalent group selected from straight chain alkyl group containing from 1 to 18 carbon atoms, a branched chain alkyl group containing from 3 to 18 carbon atoms, a cycloalkyl containing from 5 to 18 carbon atoms, an alkenyl containing from 2 to 18 carbon atoms, an aryl containing from 6 to 18 carbon atoms, aralkyl containing from 7 to 18 carbon atoms or hydrogen, or is a divalent group selected from an alkyl containing from 1 to 10 carbon atoms, a cycloalkyl containing from 5 to 10 carbon atoms or phenyl;

each $R^5$ is independently a monovalent group selected from straight chain alkyl group containing from 1 to 18 carbon atoms, a branched chain alkyl group containing from 3 to 18 carbon atoms, a cycloalkyl group containing from 5 to 18 carbon atoms, an alkenyl group containing from 2 to 18 carbon atoms, an aryl group containing from 6 to 18 carbon atoms, aralkyl group containing from 7 to 18 carbon atoms, and wherein $R^1$ and z is an integer wherein z is 1 or 2.

24. The alkoxysilyl-containing thiocarboxylic acid ester composition of claim 23 wherein the composition contains from about 70 to about 99.9 weight percent alkoxysilyl-containing thiocarboxylic acid ester of formula (I) and from 0.1 to about 30 weight percent thioester of formula (II), based on the total weight of the alkoxysilyl-containing thiocarboxylic acid of formula (I) and thioester of formula (II).

25. The alkoxysilyl-containing thiocarboxylic acid ester composition of claim 23 further comprising a mercapto-functional alkoxysilane of general formula (V):

$$HS\text{—}R^2\text{—}SiR^3_a(OR^4)_{3-a} \quad (V)$$

wherein $R^2$, $R^3$, $R^4$ and a are defined above.

26. The alkoxysilyl-containing thiocarboxylic acid ester composition of claim 25 wherein the mercapto-functional alkoxysilane of general formula (V) is from 0.1 to 50 weight percent, based on the total weight of the alkoxysilyl-containing thiocarboxylic acid (i) and thioester (ii).

27. A rubber composition comprising the alkoxysilyl-containing thiocarboxylic acid ester composition of claim 23.

28. The rubber composition of claim 27 further comprising a mercapto-functional alkoxysilane of formula (V).

\* \* \* \* \*